US009988550B2

(12) United States Patent
Bollard et al.

(10) Patent No.: US 9,988,550 B2
(45) Date of Patent: *Jun. 5, 2018

(54) OVERPRINT VARNISHES WITH NON-AQUEOUS DISPERSIONS

(71) Applicant: SUN CHEMICAL CORPORATION, Parsippany, NJ (US)

(72) Inventors: Jerome Bollard, Asnieres (FR); Richard Durand, Oradell, NJ (US); Ramasamy Krishnan, North Brunswick, NJ (US); Hiroyuki Sugiyama, Saitama (JP)

(73) Assignee: SUN CHEMICAL CORPORATION, Parsippany, NJ (US)

( * ) Notice: Subject to any disclaimer, the term of this patent is extended or adjusted under 35 U.S.C. 154(b) by 916 days.

This patent is subject to a terminal disclaimer.

(21) Appl. No.: 14/363,130

(22) PCT Filed: Dec. 6, 2012

(86) PCT No.: PCT/US2012/068300
§ 371 (c)(1),
(2) Date: Jun. 5, 2014

(87) PCT Pub. No.: WO2013/086231
PCT Pub. Date: Jun. 13, 2013

(65) Prior Publication Data
US 2014/0370220 A1 Dec. 18, 2014

Related U.S. Application Data

(60) Provisional application No. 61/568,215, filed on Dec. 8, 2011.

(51) Int. Cl.
C09D 151/00 (2006.01)
C08F 265/06 (2006.01)

(52) U.S. Cl.
CPC ........ C09D 151/003 (2013.01); C08F 265/06 (2013.01); Y10T 428/1379 (2015.01)

(58) Field of Classification Search
CPC ............... C09D 151/003; C08F 265/06; Y10T 428/1379
See application file for complete search history.

(56) References Cited

U.S. PATENT DOCUMENTS

| | | |
|---|---|---|
| 3,985,703 A | 10/1976 | Ferry et al. |
| 4,264,678 A | 4/1981 | Nelson et al. |
| 4,375,532 A | 3/1983 | Baer |
| 4,419,471 A | 12/1983 | Nelson et al. |
| 4,469,826 A | 9/1984 | Carlick et al. |
| 4,888,395 A | 12/1989 | Min |
| 4,916,171 A | 4/1990 | Brown et al. |
| 4,994,524 A | 2/1991 | Udipi |
| 5,006,592 A | 4/1991 | Oshima et al. |
| 5,087,663 A | 2/1992 | Laughner |
| 5,186,993 A | 2/1993 | Hallden-Abberton et al. |
| 5,324,780 A | 6/1994 | Oshima et al. |
| 5,331,025 A | 7/1994 | Lavoie et al. |
| 6,203,973 B1 | 3/2001 | Chen et al. |
| 6,309,739 B1 | 10/2001 | Koizumi et al. |
| 6,638,995 B1 | 10/2003 | Gelarden |
| 7,071,261 B2 | 7/2006 | Devonport et al. |
| 7,939,103 B2 | 5/2011 | Dahne et al. |
| 8,907,010 B2 * | 12/2014 | Krishnan .................. C08F 2/06 524/523 |
| 9,115,291 B2 * | 8/2015 | Bollard ...................... C08F 2/18 |
| 9,410,050 B2 * | 8/2016 | Bollard ...................... C08F 2/18 |
| 2003/0064314 A1 | 4/2003 | VanDusen et al. |
| 2005/0244736 A1 | 11/2005 | Yon et al. |
| 2012/0016069 A1 | 1/2012 | Krishnan et al. |
| 2012/0123030 A1 | 5/2012 | Krishnan et al. |

FOREIGN PATENT DOCUMENTS

| | | |
|---|---|---|
| CN | 102066427 A | 5/2011 |
| EP | 0 348 565 A1 | 1/1990 |
| WO | 2009155201 A1 | 12/2009 |
| WO | 2011014826 A1 | 2/2011 |
| WO | 2012068153 A1 | 5/2012 |

OTHER PUBLICATIONS

Chinese Office Action from Chinese Application No. 201280066333.3, dated Aug. 27, 2015 ( with English Language Translation).
International Search Report dated Mar. 19, 2013, issued in parent International Application No. PCT/US2012/068300.
Fei et al., Chalcogenide Letters 8(8):499-504 (2011).
Wang et al. (eXPRESS Polymer Letters 4(11):670-680 (2010)) describes methods.
Auguiar et al. (Macromolecules 32(20):6767-6771 (1999)).
Kazemi et al. (2008) Small 4(10):1756-1762.

* cited by examiner

Primary Examiner — John E Uselding
(74) Attorney, Agent, or Firm — Charles C. Achkar; Ostrolenk Faber LLP

(57) ABSTRACT

Provided are overprint varnish (OPV) compositions containing high viscosity essentially non-aqueous dispersions that include acrylic core/shell polymer particles in a non-aqueous solvent such as mineral oil. Also provided are methods of coating a substrate with an OPV containing the non-aqueous dispersions to improve the properties of the OPV when used to coat a substrate, such as improved rub resistance, resistance to yellowing, and desirable gloss values.

31 Claims, No Drawings

OVERPRINT VARNISHES WITH NON-AQUEOUS DISPERSIONS

RELATED APPLICATIONS

This application is a § 371 National Phase Application of International Application No. PCT/US2012/068300 filed Dec. 6, 2012, which claims the benefit of priority to U.S. Provisional Application Ser. No. 61/568,215, filed Dec. 8, 2011, entitled "OVERPRINT VARNISHES WITH NON-AQUEOUS DISPERSIONS," to Jerome Bollard, Richard Durand, Ramasamy Krishnan and Hiroyuki Sugiyama. Where permitted, the subject matter of the above-referenced is applications are incorporated by reference in its their entirety.

FIELD OF THE INVENTION

Provided herein are lithographic overprint varnishes (OPVs) that result in an OPV that improves the appearance of the substrate it is used to coat. The OPVs provided herein allow for a substrate, such as a printed substrate, to be subject to further processing, such as cutting, stacking, etc. soon after printing, without compromising on marring, scuffing or rub-off properties. The OPVs provided herein provide higher gloss, better resistance to yellowing and improved rub resistance properties soon after printing on a substrate. The invention relates to overprint varnishes that contain a high viscosity essentially non-aqueous dispersion made of acrylic core/shell polymers in a non-aqueous organic solvent (NAD), such as mineral oil, and methods of printing or coating a substrate with an overprint varnish containing a NAD to improve the appearance, setting, drying and aging properties, and rub resistance of overprint varnishes. Also provided are substrates and methods of printing on a substrate directly with the NADs provided herein, without introducing the NAD into a traditional overprint varnish.

BACKGROUND

Dispersions of polymers used in printing inks, paints and toners are known in the art (for example, see U.S. Pat. Nos. 6,638,995 and 5,331,025, U.S. Patent Pub. No. US 2005/0244736 and International Patent Pub. Nos. WO 2009/155201, WO 2011/014826 and WO 2012/068153). International Patent Pub. No. WO 2009/155201 describes the use of a non-aqueous dispersion (NAD) polymer to increase the drying speed of a sheetfed offset ink. The specification mentions that the amount of NAD present in the sheet fed offset ink is at least from about 1% to about 15%, more preferably about 5% and most preferably about 10%. The examples, however, are limited to an amount of NAD of 10 wt % based on the weight of the ink, which necessitates the use of a metal drier or metal catalyst to polymerize the ink.

International Patent Pub. No. WO 2012/068153 describes the use of a non-aqueous dispersion (NAD) polymer in printing inks in order to increase the setting and rub resistance properties of the inks when applied to a substrate. The specification mentions that the amount of NAD present in the ink ranges from 11% to 60%, or 12% to 50%, and preferably 25% to 35% based on the weight of the ink composition.

Water-based dispersed (emulsion) polymers for use in water-based overprint varnishes are also known in the art. For example, see U.S. Pat. Nos. 4,916,171 and 7,071,261. U.S. Pat. No. 4,916,171 describes the use of aqueous core-shell polymers made up of an alkali-soluble polymeric shell and an alkali-insoluble polymeric core that can be used in water-based paints, inks and overprint varnishes. U.S. Pat. No. 7,071,261 discloses aqueous compositions, such as aqueous coating compositions, that contain aqueous dispersions of polymeric nanoparticles.

U.S. Pat. No. 4,469,826 describes the use of aqueous thermoplastic polymer dispersions in non-aqueous lithographic inks and ink vehicles. The water-based polymer dispersion is separated from the water and then the finely divided particles are re-dispersed into the ink, which can be a non-aqueous (e.g., oil-based) ink. The particles of the water-based dispersion do not naturally mix into the ink at the particle size at which they were created during polymer synthesis and instead must be transferred from the aqueous phase of a polymer latex into the water-immiscible, hydrophobic organic vehicle.

Core/shell polymer technology is well known in the polymer arts. For example, see U.S. Pat. Nos. 3,985,703; 4,264,678; 4,375,532; 4,419,471; 4,888,395; 4,916,171; 4,994,524; 5,006,592; 5,087,663; 5,186,993; 5,324,780; 6,203,973; 6,309,739; 6,605,404 and 7,939,103; and Kazemi et al. (2008) Small 4(10):1756-1762. Any of the core/shell polymers known in the art that are compatible with the varnish components can be used in the present invention.

There is a need for an oil-based overprint varnish that can be used to coat a substrate containing a printed image that will exhibit desirable properties, such as high gloss, resistance to yellowing, and rub resistance shortly after printing, while also minimizing the time required before further processing of the coated substrate. Water-based polymer dispersions have been used in water-based overprint varnishes to improve the properties of a coated substrate. Water-based polymer dispersions have been used in oil-based overprint varnishes to improve the properties of a coated substrate. However, a need exists for oil-based overprint varnishes containing non-aqueous polymer dispersions, particularly where the particles of the polymer dispersion naturally mix into the coating at the particle size which they were created during polymer synthesis in a non-aqueous medium and that exists as a stable dispersion in mineral oil. A need also exists for a coating that can be used directly on a substrate after printing that improves the properties of the printed substrate, such as high gloss, resistance to yellowing, and rub resistance shortly after printing.

SUMMARY OF THE INVENTION

It has now been found that the setting and drying rates, as measured by rub resistance, aging properties, as measured by yellowing, and appearance, as measured by gloss, of overprint varnishes, including oil-based lithographic overprint varnishes, is advantageously enhanced by the inclusion of an essentially non-aqueous dispersion containing acrylic core/shell polymers in a continuous phase of an essentially non-aqueous organic solvent (NAD), particularly mineral oil. Incorporation of a NAD in lithographic overprint varnishes results in an overprint varnish that exhibits increased rub resistance, resistance to yellowing, and desirable gloss levels as compared to coatings not containing a NAD when applied to a substrate.

Provided herein are lithographic overprint varnishes and methods for improved processability of an overprint varnish-coated substrate. In particular, provided are lithographic oil-based overprint varnishes containing NAD that exhibit fast setting and drying speeds, as measured by rub resistance. The substrates set and dry quickly, allowing for processing of the substrate shortly after coating. Also provided are methods that improve the appearance of an overprint varnish-coated substrate. In particular, provided are lithographic oil-based overprint varnishes containing NAD that exhibit resistance to yellowing and desirable gloss levels and contrast. The methods also include applying to a substrate an overprint varnish that includes a NAD.

DETAILED DESCRIPTION OF THE INVENTION

It is to be understood that the foregoing general description and the following detailed description are exemplary and explanatory only and are not restrictive of any subject matter claimed.

The section headings used herein are for organizational purposes only and are not to be construed as limiting the subject matter described.

A. Definitions

Unless defined otherwise, all technical and scientific terms used herein have the same meaning as is commonly understood by one of skill in the art to which the inventions belong. All patents, patent applications, published applications and publications, websites and other published materials referred to throughout the entire disclosure herein, unless noted otherwise, are incorporated by reference in their entirety for any purpose.

In this application, the use of the singular includes the plural unless specifically stated otherwise.

In this application, the use of "or" means "and/or" unless stated otherwise. As used herein, use of the term "including" as well as other forms, such as "includes," and "included," is not limiting.

As used herein, ranges and amounts can be expressed as "about" a particular value or range. "About" is intended to also include the exact amount. Hence "about 5 percent" means "about 5 percent" and also "5 percent." "About" means within typical experimental error for the application or purpose intended.

As used herein, "improved rub resistance" refers to achieving a rub resistance of a substrate coated with an overprint varnish in a certain amount of time after printing that is better that the rub resistance achieved with a comparable control coated substrate in the same amount of time. As an example, overprint varnishes exhibiting improved rub resistance exhibit improved processability, in which the coated substrate can be subjected to further processing without detrimental effect to the coated substrate, including any image or text printed beneath the coating. In some instances, an overprint varnish demonstrating improved rub resistance has a rub resistance in 15 minutes or less that is equal to the rub resistance achieved in a standard overprint varnish after 15 minutes.

As used herein, "setting" refers to overprint varnish (or coating) film formation and apparent drying of the overprint varnish (or coating). Although the overprint varnish (or coating) chemically may not be dried, the overprint varnish (or coating) is set and exhibits rub resistance.

As used herein, "NAD" refers to an essentially non-aqueous dispersion containing acrylic core/shell polymers, which can be in the form of particles, in an essentially non-aqueous solvent. While the continuous phase of the dispersion is a non-aqueous solvent, such as a non-aqueous organic solvent, the dispersion can contain up to 1 wt % water, such as 0.001 wt % to 1 wt % water based on the weight of the composition.

As used herein, "essentially non-aqueous" refers to a composition that contains minimal to no water. In some instances, an essentially non-aqueous composition can contain up to 1.0 wt % water based on the weight of the composition.

As used herein, a "rheology adjusting component" refers to a compound or mixture of two or more compounds that when added to a dispersion modifies the rheology of the dispersion. The modification to the rheology can result in an increase in the viscosity of the dispersion.

As used herein, "core-to-shell ratio" or "core/shell ratio" refers to the value obtained when the amount of acrylic core polymer in a core/shell polymer particle is divided by the amount of acrylic shell polymer in a core/shell polymer particle.

As used herein, "overprint varnish" refers to a coating that can be used to coat a substrate.

As used herein, "yellowing" refers to the visual appearance of the applied overprint varnish coating, and especially to changes in the appearance upon aging. Yellowing can be assessed by measuring Hunter L,a,b color scale values (LAB values), particularly B values and delta B. Lower delta B values indicate lower yellowing.

As used herein, "gloss" refers to the ability of a coating to reflect light, with a higher gloss value corresponding to a larger amount of light being reflected. The gloss readings are typically measured at a 60 degree angle and are reported in gloss units, which uses the angle of measurement and the gloss value at 75° per the American Society for Testing and Materials (ASTM) D523 standard for the general evaluation of gloss.

B. Improved Overprint Varnishes

A problem to be solved is that current overprint varnishes do not impart sufficient setting and drying properties, e.g., rub resistance, to the substrate after coating so that the coated substrate can be subjected to further processing shortly after coating. A problem to be solved is that current overprint varnishes do not provide sufficient protection from yellowing after a coated substrate has been allowed to age for a period of time. A problem to be solved is that current overprint varnishes do not provide desirable gloss levels to substrates coated with the overprint varnish and sufficient gloss contrast to printed substrates coated with the overprint varnish. It has been found that coating a substrate with an overprint varnish containing from between or about between 10 wt % and 100 wt %, or greater than 60 wt %, or between at or about between 65 wt % and 100 wt % of an acrylic core/shell polymer (NAD) can improve setting and drying properties, e.g., rub resistance, to a substrate after coating as compared to a substrate coated with the same overprint varnish not containing NAD. The overprint varnish compositions containing between or about between 10 wt % and 100 wt %, or greater than 60 wt %, or between at or about between 65 wt % and 100 wt % NAD provide sufficient protection from yellowing after a coated substrate has aged for a period of time. The overprint varnish compositions containing between or about between 10 wt % and 100 wt %, or greater than 60 wt %, or between at or about between 65 wt % and 100 wt % NAD provide desirable gloss levels to substrates.

It has been found that the setting and drying properties, as measured by rub resistance, aging properties, as measured by yellowing, and gloss levels of lithographic non-aqueous overprint varnishes can be advantageously enhanced by the inclusion of a non-aqueous dispersion (NAD) as described herein such as inclusion of between or about between 10 wt % and 100 wt %, or greater than 60 wt %, or between at or about between 65 wt % and 100 wt %. Incorporation of a NAD in an overprint varnish results in an overprint varnish that exhibits increased rub resistance, decreased yellowing and desirable gloss values as compared to the same overprint varnish that does not include a NAD.

The NADs provided herein can be used to in traditional lithographic non-aqueous overprint varnishes. Alternatively, the NADs can be used as an overprint varnish, without incorporation into a traditional overprint varnish formulation, such as, for example, a resin and a solvent.

C. Essentially Non-Aqueous Dispersions of Acrylic Core/Shell Polymer (NADs)

Core/shell polymers have been used successfully in paints and inks to control body, encapsulate pigment, and to provide emulsion-like dispersions in water-free environments. Preferred NADs for overprint varnishes contain insoluble acrylic polymer particles dispersed in an essentially non-aqueous organic medium. These dispersions are attractive additives for overprint varnishes due to their controlled particle size.

The preferred NAD used in the overprint varnishes provided herein can be formed by generating an acrylic core-shell polymer where the shell polymer is soluble in the continuous phase solvent while the acrylic core polymer is insoluble in the solvent, but soluble in the shell polymer. This structure can be obtained through a 2-step polymerization process where the shell polymer is formed first and then the acrylic core polymer is "filled in," generating a dispersion. This process is described in WO 2009/155201A and WO 2012/068153, which are incorporated herein in their entirety by reference.

In the preparation of the NAD, the acrylic monomers used to make the acrylic shell polymer and/or the acrylic core polymer can include a functional group selected from among a carboxyl group, a hydroxyl group and a vinyl group.

The acrylic core polymer and/or the acrylic shell polymer of the NAD can include monomers that include a carboxyl functional group. Exemplary monomers that include a carboxyl functional group include acrylic acid, methacrylic acid, itaconic acid and maleic acid.

The acrylic core polymer and/or the acrylic shell polymer of the NAD can include monomers that include a hydroxyl functional group. Exemplary monomers that include a hydroxyl functional group include 2-hydroxy ethyl acrylates, 2-hydroxy ethyl methacrylates, 2-hydroxy propyl acrylates and 2-hydroxy propyl methacrylates.

The acrylic core polymer and/or the acrylic shell polymer of the NAD can include monomers that include a vinyl functional group. Exemplary monomers that include a vinyl functional group include glycidyl acrylate; glycidyl methacrylates and dimethyl amino methacrylate.

The NAD can be prepared by selecting a pre-formed acrylic shell polymer that is soluble in the essentially non-aqueous solvent continuous phase and then generating an acrylic core polymer from monomers selected to form an acrylic core polymer that is insoluble in the essentially non-aqueous solvent, but soluble in the shell polymer. By reacting the pre-formed acrylic shell polymer with the acrylic core polymer in the essentially non-aqueous solvent at an elevated temperature, such as between 85° C.-140° C., the acrylic core polymer preferentially interacts with the acrylic shell polymer to form core/shell polymers, particularly core/shell polymer particles, generating a dispersion of core/shell polymer in the essentially non-aqueous solvent continuous phase.

The NAD also can be prepared by selecting a pre-formed acrylic shell polymer that is soluble in the essentially non-aqueous solvent continuous phase and selecting a pre-formed acrylic core polymer that is insoluble in the essentially non-aqueous solvent, but soluble in the shell polymer. By reacting the pre-formed acrylic shell polymer with the pre-formed acrylic core polymer in the essentially non-aqueous solvent at an elevated temperature, such as between 85° C.-140° C., the acrylic core polymer preferentially interacts with the acrylic shell polymer to form core/shell polymers, particularly core/shell polymer particles, generating a dispersion of core/shell polymer in the essentially non-aqueous solvent continuous phase.

D. Acrylic Core/Shell Polymer NAD Formation

The non-aqueous dispersions (NADs) provided herein can be formed by generating an acrylic core/shell polymer where the shell polymer is soluble in an essentially non-aqueous organic solvent continuous phase while the acrylic core polymer is insoluble in the solvent, but soluble in the shell polymer. The acrylic core/shell polymer can be formed in a two-step polymerization process in which the shell polymer is formed first and then the acrylic core polymer is "filled in," generating a dispersion.

1. Acrylic Shell Polymer

The shell polymer can be formed using any method known in the art to form a polymer. For example, the acrylic shell polymer of the acrylic core/shell polymer can be formed by first heating a continuous phase solvent, for example, an essentially non-aqueous solvent, to 120° C. or to about 120° C., under an inert gas, such as nitrogen gas, in a reaction vessel. The essentially non-aqueous solvent continuous phase can be an organic medium, such as a hydrocarbon solvent, for example a hydrocarbon oil. The oil should have good solubility, preferably with an aniline point between from or between about from 45° C. to 90° C., or 50° C. to 80° C., such as at or about 45° C., 50° C., 55° C., 60° C., 65° C., 70° C., 75° C., 80° C., 85° C. or 90° C. Suitable hydrocarbon solvents include paraffinic oils, such as white mineral oils (CAS No. 8042-47-5), e.g., Magie N-40 oil; naphthenic oils and distillates, such as hydrotreated light naphthenic distillates (CAS No. 64742-53-6), e.g., Nytex® 5130, and hydrotreated heavy naphthenic distillates (CAS No. 64742-52-5), e.g., Nytex® 510 and Nytex® 810); and aromatic oils. The hydrocarbon solvent optionally can be a process oil containing bitumen (CAS No. 64742-93-4), such as Nyprint 863.

The hydrocarbon solvent preferably has a sulfur content at or below 1000 ppm. Generally, it is preferred that the hydrocarbon solvent has a sulfur content at or below 750 ppm, and more preferably below 500 ppm. For example, the sulfur content can be at or about 1 ppm, 10 ppm, 25 ppm, 50 ppm, 75 ppm, 100 ppm, 125 ppm, 150 ppm, 175 ppm, 200 ppm, 225 ppm, 250 ppm, 275 ppm, 300 ppm, 325 ppm, 350 ppm, 375 ppm, 400 ppm, 425 ppm, 450 ppm or 475 ppm, but less than 500 ppm sulfur. Exemplary continuous phase solvents that can be used to synthesize the shell polymers provided herein are hydrotreated light naphthenic distillates, e.g., Nytex® 5130.

The total amount of essentially non-aqueous solvent continuous phase used in the synthesis of the shell polymers provided herein, as a percentage (%) by weight of the total reaction mixture (wt %), can be, e.g., between from or about from 1 wt % to 60 wt %, such as 1 wt % to 10 wt %, 1 wt % to 15 wt %, 1 wt % to 25 wt %, 1 wt % to 30 wt %, 1 wt % to 40 wt %, 1 wt % to 50 wt %, 5 wt % to 10 wt %, 5 wt % to 15 wt %, 5 wt % to 25 wt %, 5 wt % to 30 wt %, 5 wt % to 40 wt %, 5 wt % to 50 wt %, 10 wt % to 20 wt %, 10 wt % to 30 wt %, 10 wt % to 40 wt %, 10 wt % to 50 wt %, 15 wt % to 25 wt %, 15 wt % to 30 wt %, 15 wt % to 35 wt %, 15 wt % to 40 wt %, 15 wt % to 45 wt %, 15 wt % to 50 wt %, 20 wt % to 30 wt %, 20 wt % to 40 wt %, 20 wt % to 50 wt %, 25 wt % to 30 wt %, 25 wt % to 35 wt %, 25 wt % to 40 wt %, 25 wt % to 45 wt %, 25 wt % to 50 wt %, 25 wt % to 60 wt %, 30 wt % to 40 wt %, 30 wt % to 50 wt %, 30 wt % to 60 wt %, 40 wt % to 50 wt %, 40 wt % to 55 wt %, 40 wt % to 60 wt %, 45 wt % to 50 wt %, 45 wt % to 55 wt %, 45 wt % to 60 wt %, 50 wt % to 60 wt %, 50 wt % to 55 wt %, and 55 wt % to 60 wt %, based on the weight of the total reaction mixture. Generally, the total reaction mixture contains less than 60 wt % solvent. For example, the reaction mixtures provided herein can contain at least or about at least 1 wt %, 3 wt %, 5 wt %, 7 wt %, 10 wt %, 12 wt %, 15 wt %, 17 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 40 wt %, 42 wt %, 45 wt %, 48 wt %, 50 wt %, 55 wt %, but less than 60 wt % total solvent based on the weight of the total reaction mixture.

A mixture of acrylic monomers and a catalyst or a mixture of catalysts can be added over a period of time to the reaction vessel containing the continuous phase essentially non-aqueous solvent. The period of time can be, for example, 1 to 5 hours, or 1, 2, 3, 4 or 5 hours, such as 4 hours or about 4 hours. The temperature of the first reaction vessel can be between 85° C. to 140° C., or 90° C. to 130° C., for example at or about 85° C., 90° C., 95° C., 100° C., 105° C., 110° C., 115° C., 120° C., 125° C., 130° C., 135° C. or 140° C., such as 120° C. or about 120° C. The mixture of monomers and mixture of catalysts can be added concurrently to the first reaction vessel from separate reaction vessels.

The mixture of monomers can be pre-mixed in a separate mixing vessel and can include monomers that are soluble in the continuous phase solvent. Such monomers can contain hydrocarbon chains. The hydrocarbon chains on the monomers can make the resulting polymer readily soluble in the continuous phase solvent. The monomers can contain one or more functional groups, such as carboxyl groups. Exemplary monomers that can contain carboxyl groups are acrylic acid and substituted acrylic acids (e.g., n-butyl acrylate), methacrylic acid and substituted methacrylic acids (e.g., isobutyl methacrylate, dodecyl methacrylate, methyl methacrylate and n-butyl methacrylate), itaconic acid and substituted itaconic acids, and maleic acid and substituted maleic acids. The monomers can contain hydroxyl groups. Exemplary monomers that can contain hydroxyl groups include 2-hydroxy ethyl acrylates, 2-hydroxy ethyl methacrylates, 2-hydroxy propyl acrylates and 2-hydroxy propyl methacrylates. The monomers can contain vinyl functional groups. Exemplary vinyl functional groups include glycidyl acrylates, glycidyl methacrylates and dimethyl amino methacrylates. Monomers that contain epoxy functional groups, such as glycidyl acrylates, can be added to the monomer mixture to increase the attraction between the acrylic shell and acrylic core polymers. The monomers can contain one or more than one functional group or a combination of functional groups such as carboxyl, hydroxyl and vinyl.

In the shell polymers provided herein, the monomer mixture can contain two or more monomers. For example, the mixture of monomers can be a mixture of substituted methacrylic acids. The methacrylic acids can be $C_1$-$C_{12}$ alkyl methacrylates. Exemplary $C_1$-$C_{12}$ alkyl methacrylates that can be used in the shell polymers provided herein are isobutyl methacrylate and dodecyl methacrylate. The ratio of isobutyl methacrylate to dodecyl methacrylate can be or can be about 10:1, 9:1, 8:1, 7:1, 6:1, 5:1, 4:1, 3:1, 2:1, 1.5:1, 1.3:1, 1.1:1 or 1:1 or less.

To aid in efficient polymer formation, a polymerization promoter can be added to the monomer mixture. The polymerization promoters are co-polymerizable with the acrylate monomers (and other co-monomers, if present) of the acrylic core/shell polymers. The promoters can promote polymerization or cross-linking, and/or introduce pendant groups, e.g., cross-linkable pendant carboxylic groups, cross-linkable pendant hydroxyl groups and/or cross-linkable pendant amide groups, into the copolymer backbone. Exemplary polymerization promoters include acrylic acid or $C_1$-$C_6$-substituted acrylic acid, e.g., methacrylic acid (to introduce cross-linkable pendant carboxylic groups into the copolymer backbone), hydroxyalkyl esters of acrylic acid or $C_1$-$C_6$-alkyl-substituted acrylic acid, such as 2-hydroxyethyl acrylate, 2-hydroxypropyl acrylate and 3-hydroxypropyl methacrylate (to introduce cross-linkable pendant hydroxyl groups into the copolymer backbone), and an acrylic acid amide or $C_1$-$C_6$-alkyl-substituted acrylic acid amide, such as hydroxymethylene diacetone acrylamide (to introduce cross-linkable pendant amide groups into the copolymer backbone). A preferred polymerization promoter contains acrylic acid. An exemplary polymerization promoter is acrylic acid. The amount of polymerization promoter that can be used can be from at or about 0.5 wt % to at or about 5 wt % based on the weight of the reaction mixture. In an exemplary monomer mixture, 1 wt % or about 1 wt % acrylic acid based on the weight of the reaction mixture can be present.

In the acrylic shell polymers provided herein, the total weight of monomer or monomer mixture as a percentage (%) by weight of the reaction mixture (wt %) can be, for example, between from or about from 1 wt % to 60 wt %, such as 1 wt % to 10 wt %, 1 wt % to 15 wt %, 1 wt % to 25 wt %, 1 wt % to 30 wt %, 1 wt % to 40 wt %, 1 wt % to 50 wt %, 5 wt % to 10 wt %, 5 wt % to 15 wt %, 5 wt % to 25 wt %, 5 wt % to 30 wt %, 5 wt % to 40 wt %, 5 wt % to 50 wt %, 10 wt % to 20 wt %, 10 wt % to 30 wt %, 10 wt % to 40 wt %, 10 wt % to 50 wt %, 15 wt % to 25 wt %, 15 wt % to 30 wt %, 15 wt % to 35 wt %, 15 wt % to 40 wt %, 15 wt % to 45 wt %, 15 wt % to 50 wt %, 20 wt % to 30 wt %, 20 wt % to 40 wt %, 20 wt % to 50 wt %, 25 wt % to 30 wt %, 25 wt % to 35 wt %, 25 wt % to 40 wt %, 25 wt % to 45 wt %, 25 wt % to 50 wt %, 25 wt % to 60 wt %, 30 wt % to 40 wt %, 30 wt % to 50 wt %, 30 wt % to 60 wt %, 40 wt % to 50 wt %, 40 wt % to 55 wt %, 40 wt % to 60 wt %, 45 wt % to 50 wt %, 45 wt % to 55 wt %, 45 wt % to 60 wt %, 50 wt % to 60 wt %, 50 wt % to 55 wt %, or 55 wt % to 60 wt %, by weight of the reaction mixture, which contains an essentially non-aqueous solvent, acrylic monomer or mixture of acrylic monomers and other reactants. Generally, the reaction mixture generally contains less than 60 wt % acrylic monomer or acrylic monomer mixture. For example, the reaction mixtures provided herein can contain at least or about at least 1 wt %, 3 wt %, 5 wt %, 7 wt %, 10 wt %, 12 wt %, 15 wt %, 17 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 35 wt %, 40 wt %, 42 wt %, 45 wt %, 48 wt %, 50 wt %, 55 wt % or 60 wt % total monomer mixture based on the total weight of the reaction mixture.

The catalyst or mixture of catalysts can be pre-mixed in a separate vessel before adding to the reaction vessel containing the reaction mixture. The catalyst pre-mix can include one or more polymerization initiators. The polymerization initiators can be, for example, organic peroxide catalysts. Exemplary organic peroxide catalysts include dialkyl peroxides, di-tert-alkyl peroxides, diacyl peroxides, dialkyl peroxydicarbamates, tert-alkyl peroxyesters and di-tert-alkyl peroxy-ketals. Preferred polymerization initiators are the dialkyl peroxides, such as tert-butyl peroctoate and tert-butyl peroxybenzoate. The polymerization initiators can be free radical initiators. Exemplary free radical initiators include azo initiators. A preferred azo initiator is, for example, Vazo® 67 (DuPont, Wilmington, Del.). The catalyst mixture can contain two or more polymerization initiators. For example, the mixture of catalysts can be a mixture of organic peroxide catalysts. Exemplary organic peroxide catalysts that can be used in the shell polymers provided herein are tert-butyl peroctoate and tert-butyl peroxybenzoate. The ratio of tert-butyl peroctoate to tert-butyl peroxybenzoate can be or can be about 10:1, 9:1, 8:1, 7:1, 6:1, 5:1, 4:1, 3:1, 2:1, 1.5:1, 1.3:1, 1.1:1 or 1:1 or less.

The catalysts can be pre-mixed in a continuous phase solvent, for example the same continuous phase solvent present in the reaction vessel (e.g., Nytex® 5130).

After the mixture of monomers and mixture of catalysts are added to the reaction vessel, and after mixing at a temperature between 85° C. to 140° C., or 90° C. to 130° C., for example at or about 85° C., 90° C., 95° C., 100° C., 105° C., 110° C., 115° C., 120° C., 125° C., 130° C., 135° C. or 140° C., such as 120° C. or about 120° C. for a period of time between, for example, 1 to 5 hours, or 1, 2, 3, 4 or 5 hours, such as 4 hours or about 4 hours, the inert gas can be changed to air. Additional polymerization initiator, for example, the same polymerization initiator used in the catalyst mixture (e.g., t-butyl peroctoate), can be added to the reaction vessel. For example, additional polymerization initiator can be added in an amount of up to 1 wt % or about 1 wt %, such as 0.1 wt %, 0.2 wt %, 0.3 wt %, 0.4 wt %, 0.5 wt %, 0.6 wt %, 0.7 wt %, 0.8 wt %, 0.9 wt % or 1 wt % based on the weight of the reaction mixture. The reaction vessel then can be held at the same temperature, for example at 120° C. or about 120° C., for a time from between 1 to 4 hours, such as for or about for 1, 1.5, 2, 2.5, 3. 3.5 or 4 hours, for example, 2 hours or about 2 hours.

The viscosity of the composition can be modified by slowly adding one or more rheology adjusting components, such as, for example, water, an alcohol, an alkali compound, an amine or a combination thereof, to the reaction vessel. Addition of the rheology adjusting component can increase the viscosity of the resulting NAD such that addition of a relatively large amount of the NAD, such as between or about between 15 wt % to 60 wt % based on the weight of the overprint varnish, to an overprint varnish will not adversely affect the desired viscosity range of the overprint varnish.

The alcohol that can be used as or in the rheology adjusting component can be, for example, a $C_1$-$C_6$ alcohol, such as isopropanol (isopropyl alcohol), butanol, ethanol and methanol. Suitable alkali compounds that can used as or in the rheology adjusting component include metal hydroxides. Exemplary metal hydroxides include potassium hydroxide, sodium hydroxide and calcium hydroxide. Exemplary amines that can be used as or in the rheology adjusting component can be a primary amine (e.g., ethyl amine), secondary amine (e.g., diethylamine) or tertiary amine (e.g., triethylamine). For example, the rheology adjusting component can contain a mixture of water, an alcohol, an alkali compound and an amine. An exemplary rheology adjusting component contains water, potassium hydroxide, such as 85 wt % potassium hydroxide, isopropanol and diethylamine.

In the acrylic shell polymers provided herein, the total amount of rheology adjusting component as a percentage (%) by weight of the reaction mixture (wt %) can be, for example, between from or about from 0.01 wt % to 2 wt %, such as 0.01 wt % to 0.1 wt %, 0.01 wt % to 0.2 wt %, 0.01 wt % to 0.3 wt %, 0.01 wt % to 0.4 wt %, 0.01 wt % to 0.5 wt %, 0.01 wt % to 0.6 wt %, 0.01 wt % to 0.7 wt %, 0.01 wt % to 0.8 wt %, 0.01 wt % to 0.9 wt %, 0.01 wt % to 1.0 wt %, 0.01 wt % to 1.1 wt %, 0.01 wt % to 1.2 wt %, 0.01 wt % to 1.3 wt %, 0.01 wt % to 1.4 wt %, 0.01 wt % to 1.5 wt %, 0.01 wt % to 1.6 wt %, 0.01 wt % to 1.7 wt %, 0.01 wt % to 1.8 wt %, 0.01 wt % to 1.9 wt %, 0.1 wt % to 0.2 wt %, 0.1 wt % to 0.3 wt %, 0.1 wt % to 0.4 wt %, 0.1 wt % to 0.5 wt %, 0.1 wt % to 1.0 wt %, 0.1 wt % to 1.5 wt %, 0.1 wt % to 2.0 wt %, 0.5 wt % to 1.0 wt %, 0.5 wt % to 1.1 wt %, 0.5 wt % to 1.2 wt %, 0.5 wt % to 1.3 wt %, 0.5 wt % to 1.4 wt %, 0.5 wt % to 1.5 wt %, 0.5 wt % to 1.6 wt %, 0.5 wt % to 1.7 wt %, 0.5 wt % to 1.8 wt %, 0.5 wt % to 1.9 wt %, 0.5 wt % to 2.0 wt %, 1.0 wt % to 1.1 wt %, 1.0 wt % to 1.2 wt %, 1.0 wt % to 1.3 wt %, 1.0 wt % to 1.4 wt %, 1.0 wt % to 1.5 wt %, 1.0 wt % to 1.6 wt %, 1.0 wt % to 1.7 wt %, 1.0 wt % to 1.8 wt %, 1.0 wt % to 1.9 wt %, 1.0 wt % to 2.0 wt %, 1.2 wt % to 1.3 wt %, 1.2 wt % to 1.4 wt %, 1.2 wt % to 1.5 wt %, 1.2 wt % to 1.6 wt %, 1.2 wt % to 1.7 wt %, 1.2 wt % to 1.8 wt %, 1.2 wt % to 1.9 wt %, 1.2 wt % to 2.0 wt %, 1.5 wt % to 1.6 wt %, 1.5 wt % to 1.7 wt %, 1.5 wt % to 1.8 wt %, 1.5 wt % to 1.9 wt %, 1.5 wt % to 2.0 wt %, 1.7 wt % to 1.8 wt %, 1.7 wt % to 1.9 wt %, 1.7 wt % to 2.0 wt %, 1.8 wt % to 2.0 wt %, and 1.9 wt % to 2.0 wt %, based on the weight of the reaction mixture.

Generally, the reaction mixture contains less than 2.0 wt % water. For example, the reaction mixtures provided herein can contain water in an amount of up to 0.001 wt %, 0.01 wt %, 0.05 wt %, 0.1 wt %, 0.2 wt %, 0.25 wt %, 0.3 wt %, 0.4 wt %, 0.5 wt %, 0.6 wt %, 0.7 wt %, 0.75 wt %, 0.8 wt %, 0. wt %, 1.0 wt %, 1.1 wt %, 1.2 wt %, 1.25 wt %, 1.3 wt %, 1.4 wt %, 1.5 wt %, 1.6 wt %, 1.7 wt %, 1.75 wt %, 1.8 wt %, 1.9 wt % or 2.0 wt % based on the weight of the reaction mixture. Because the rheology adjusting component, which includes water, can be added to the reaction vessel at high temperatures, such as at 120° C. or about 120° C., a large part of the water from the rheology adjusting component can be distilled off, thus reducing the total amount of water present in the shell polymer and/or the NAD.

The constituents of the rheology adjusting component can be pre-mixed in a separate vessel and slowly added to the reaction vessel in order to control any foaming that can occur. After addition of the rheology adjusting component, the reaction vessel can be held at the same temperature, for example at 120° C. or about 120° C., for 1 hour or about 1 hour. The reaction vessel then can be cooled to allow discharge of the resulting acrylic shell polymer. The reaction vessel can be cooled down to a temperature of 90° C. or about 90° C. The reaction vessel can be cooled down to a temperature of less than or equal to 85° C. or less than or equal to about 85° C.

2. Acrylic Core Polymer and NAD

The acrylic core polymer of the acrylic core/shell polymer of the NAD described herein can be formed by heating in a reaction vessel an essentially non-aqueous solvent continuous phase and the acrylic shell polymer provided herein (and as described above) to between or about between 85° C. to 140° C., such as at or about 85° C., 90° C., 95° C., 100° C., 105° C., 110° C., 115° C., 120° C., 125° C., 130° C., 135° C. or 140° C. The reaction vessel can be heated under an inert gas, such as nitrogen gas. The total amount of acrylic shell polymer, e.g., the acrylic shell polymer provided herein, added to the reaction mixture as a percentage (%) by weight of the reaction mixture (wt %) can be, for example, between from or about from 1 wt % to 60 wt %, such as 1 wt % to 10 wt %, 1 wt % to 15 wt %, 1 wt % to 25 wt %, 1 wt % to 30 wt %, 1 wt % to 40 wt %, 1 wt % to 50 wt %, 5 wt % to 10 wt %, 5 wt % to 15 wt %, 5 wt % to 25 wt %, 5 wt % to 30 wt %, 5 wt % to 40 wt %, 5 wt % to 50 wt %, 10 wt % to 20 wt %, 10 wt % to 30 wt %, 10 wt % to 40 wt %, 10 wt % to 50 wt %, 15 wt % to 25 wt %, 15 wt % to 30 wt %, 15 wt % to 35 wt %, 15 wt % to 40 wt %, 15 wt % to 45 wt %, 15 wt % to 50 wt %, 20 wt % to 30 wt %, 20 wt % to 40 wt %, 20 wt % to 50 wt %, 25 wt % to 30 wt %, 25 wt % to 35 wt %, 25 wt % to 40 wt %, 25 wt % to 45 wt %, 25 wt % to 50 wt %, 25 wt % to 60 wt %, 30 wt % to 40 wt %, 30 wt % to 50 wt %, 30 wt % to 60 wt %, 40 wt % to 50 wt %, 40 wt % to 55 wt %, 40 wt % to 60 wt %, 45 wt % to 50 wt %, 45 wt % to 55 wt %, 45 wt % to 60 wt %, 50 wt % to 60 wt %, 50 wt % to 55 wt %, and 55 wt % to 60 wt %, based on the weight of the reaction mixture. Generally, the reaction mixture contains less than 60 wt % acrylic shell polymer. For example, the reaction mixture can contain acrylic shell polymer in an amount that is at least or about at least 1 wt %, 3 wt %, 5 wt %, 7 wt %, 10 wt %, 12 wt %, 15 wt %, 17 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 40 wt %, 42 wt %, 45 wt %, 48 wt %, 50 wt % or 55 wt %, but less than 60 wt % based on the weight of the reaction mixture.

The essentially non-aqueous continuous phase solvent can be an organic medium, such as a hydrocarbon solvent, for example a hydrocarbon oil. The hydrocarbon solvent should have good solubility, preferably with an aniline point between from or between about from 45° C. to 90° C., or 50° C. to 80° C., such as at or about 45° C., 50° C., 55° C., 60° C., 65° C., 70° C., 75° C., 80° C., 85° C. or 90° C. Suitable hydrocarbon solvents include paraffinic oils, such as white mineral oils, e.g., mineral oils of CAS No. 64742-47-8, such as Magie N-40 oil; naphthenic oils and distillates, such as hydrotreated light naphthenic distillates (e.g., process oils of CAS No. 64742-53-6, such as Nytex® 5130) and hydrotreated heavy naphthenic distillates (e.g., process oils of CAS No. 64742-52-5, such as Nytex® 510 and Nytex® 810); and aromatic oils. The hydrocarbon solvent optionally can contain bitumen (CAS No. 64742-93-4), such as Nyprint 863.

The hydrocarbon solvent can have a sulfur content at or below 1000 ppm. Generally, the hydrocarbon solvent has a sulfur content at or below 500 ppm. Generally, the hydrocarbon solvent has a sulfur content at or below 500 ppm. For example, the sulfur content can be at or about 1 ppm, 10 ppm, 25 ppm, 50 ppm, 75 ppm, 100 ppm, 125 ppm, 150 ppm, 175 ppm, 200 ppm, 225 ppm, 250 ppm, 275 ppm, 300 ppm, 325 ppm, 350 ppm, 375 ppm, 400 ppm, 425 ppm, 450 ppm, or 475 ppm, but less than 500 ppm sulfur. Exemplary continuous phase solvents that can be used to synthesize the acrylic core polymers provided herein are hydrotreated light naphthenic distillates, particularly Nytex® 5130.

The total amount of essentially non-aqueous continuous phase solvent used in the synthesis of the acrylic core polymers provided herein, as a percentage (%) by weight of the total reaction mixture (wt %) can be, for example, between from or about from 1 wt % to 60 wt %, such as 1 wt % to 10 wt %, 1 wt % to 15 wt %, 1 wt % to 25 wt %, 1 wt % to 30 wt %, 1 wt % to 40 wt %, 1 wt % to 50 wt %, 5 wt % to 10 wt %, 5 wt % to 15 wt %, 5 wt % to 25 wt %, 5 wt % to 30 wt %, 5 wt % to 40 wt %, 5 wt % to 50 wt %, 10 wt % to 20 wt %, 10 wt % to 30 wt %, 10 wt % to 40 wt %, 10 wt % to 50 wt %, 15 wt % to 25 wt %, 15 wt % to 30 wt %, 15 wt % to 35 wt %, 15 wt % to 40 wt %, 15 wt % to 45 wt %, 15 wt % to 50 wt %, 20 wt % to 30 wt %, 20 wt % to 40 wt %, 20 wt % to 50 wt %, 25 wt % to 30 wt %, 25 wt % to 35 wt %, 25 wt % to 40 wt %, 25 wt % to 45 wt %, 25 wt % to 50 wt %, 25 wt % to 60 wt %, 30 wt % to 40 wt %, 30 wt % to 50 wt %, 30 wt % to 60 wt %, 40 wt % to 50 wt %, 40 wt % to 55 wt %, 40 wt % to 60 wt %, 45 wt % to 50 wt %, 45 wt % to 55 wt %, 45 wt % to 60 wt %, 50 wt % to 60 wt %, 50 wt % to 55 wt %, and 55 wt % to 60 wt %, based on the weight of the total reaction mixture. Generally, the total reaction mixture generally contains less than 60 wt % solvent. For example, the reaction mixtures provided herein can contain solvent in an amount that is at least or about at least 1 wt %, 3 wt %, 5 wt %, 7 wt %, 10 wt %, 12 wt %, 15 wt %, 17 wt %, 19 wt %, 20 wt %, 21 wt %, 22 wt %, 23 wt %, 24 wt %, 25 wt %, 26 wt %, 27 wt %, 30 wt %, 35 wt %, 40 wt %, 42 wt %, 45 wt %, 48 wt %, 50 wt %, 55 wt % or 60 wt % based on the weight of the reaction mixture.

A mixture of acrylic monomers and a mixture of catalysts can be added over a period of time to the reaction vessel containing the essentially non-aqueous continuous phase solvent and acrylic shell polymer. The period of time can be between or about between 1 and 5 hours, e.g., 1, 2, 3, 4 or 5 hours, for example, 3 hours or about 3 hours. The temperature of the reaction vessel can be between or about between 85° C. and 140° C., such as at or about 85° C., 90° C., 95° C., 100° C., 105° C., 110° C., 115° C., 120° C., 125° C., 130° C., 135° C. or 140° C. The mixture of acrylic monomers and mixture of catalysts can be added concurrently to the reaction vessel from separate delivery vessels. The reaction vessel then can be held at between or about between 85° C. and 140° C., such as at or about 85° C., 90° C., 95° C., 100° C., 105° C., 110° C., 115° C., 120° C., 125° C., 130° C., 135° C. or 140° C. The reaction vessel can be held for between 1 and 5 hours, e.g., 1, 2, 3, 4 or 5 hours, for example, 3 hours or about 3 hours.

The mixture of acrylic monomers can be pre-mixed in a separate mixing vessel and can include monomers that are soluble in the essentially non-aqueous continuous phase solvent. Such monomers can contain hydrocarbon chains. The hydrocarbon chains on the monomers can make the resulting polymer readily soluble in the essentially non-aqueous continuous phase solvent. The monomers can contain one or more functional groups, such as carboxyl groups. Exemplary monomers that contain carboxyl groups are acrylic acid and substituted acrylic acids (e.g., n-butyl acrylate), methacrylic acid and substituted methacrylic acids (e.g., isobutyl methacrylate, dodecyl methacrylate, methyl methacrylate and n-butyl methacrylate), itaconic acid and substituted itaconic acids, and maleic acid and substituted maleic acids. The monomers can contain hydroxyl groups. Exemplary monomers that can contain hydroxyl groups include 2-hydroxy ethyl acrylates, 2-hydroxy ethyl methacrylates, 2-hydroxy propyl acrylates and 2-hydroxy propyl methacrylates. The monomers can contain vinyl functional groups. Exemplary vinyl functional groups include glycidyl acrylates, glycidyl methacrylates and dimethyl amino methacrylates. Monomers that contain epoxy functional groups, such as glycidyl acrylates, can be added to the monomer mixture to increase the attraction between the acrylic shell and acrylic core polymers. The monomers can contain one or more than one functional group or a combination of functional groups such as carboxyl, hydroxyl and vinyl.

In the acrylic core polymers provided herein, the monomer mixture added to the reaction vessel can contain two or more monomers. For example, the mixture of monomers can be a mixture of substituted acrylic and methacrylic acids. The acrylic and methacrylic acids can be $C_1$-$C_{12}$ alkyl acrylates and methacrylates. Exemplary $C_1$-$C_{12}$ alkyl acrylic and methacrylic acids that can be used in the acrylic core polymers provided herein are n-butyl acrylate, methyl methacrylate and n-butyl methacrylate. The ratio of methyl methacrylate to n-butyl methacrylate can be or can be about 10:1, 9:1, 8:1, 7:1, 6:1, 5:1, 4:1, 3:1, 2:1, 1.5:1, 1.3:1, 1.1:1 or 1:1 or less. The ratio of methyl methacrylate to n-butyl acrylate can be or can be about 10:1, 9:1, 8:1, 7:1, 6:1, 5:1, 4:1, 3:1, 2:1, 1.5:1, 1.3:1, 1.1:1 or 1:1 or less. The ratio of n-butyl acrylate to n-butyl methacrylate can be or can be about 10:1, 9:1, 8:1, 7:1, 6:1, 5:1, 4:1, 3:1, 2:1, 1.7:1, 1.5:1, 1.4:1, 1.3:1, 1.2:1, 1.1:1 or 1:1 or less.

In the acrylic core polymers provided herein, the total amount of monomer mixture as a percentage (%) by weight of the reaction mixture (wt %) can be, for example, between from or about from 1 wt % to 60 wt %, such as 1 wt % to 10 wt %, 1 wt % to 15 wt %, 1 wt % to 25 wt %, 1 wt % to 30 wt %, 1 wt % to 40 wt %, 1 wt % to 50 wt %, 5 wt % to 10 wt %, 5 wt % to 15 wt %, 5 wt % to 25 wt %, 5 wt % to 30 wt %, 5 wt % to 40 wt %, 5 wt % to 50 wt %, 10 wt % to 20 wt %, 10 wt % to 30 wt %, 10 wt % to 40 wt %, 10 wt % to 50 wt %, 15 wt % to 25 wt %, 15 wt % to 30 wt %, 15 wt % to 35 wt %, 15 wt % to 40 wt %, 15 wt % to 45 wt %, 15 wt % to 50 wt %, 20 wt % to 30 wt %, 20 wt % to 40 wt %, 20 wt % to 50 wt %, 25 wt % to 30 wt %, 25 wt % to 35 wt %, 25 wt % to 40 wt %, 25 wt % to 45 wt %, 25 wt % to 50 wt %, 25 wt % to 60 wt %, 30 wt % to 40 wt %, 30 wt % to 50 wt %, 30 wt % to 60 wt %, 40 wt % to 50 wt %, 40 wt % to 55 wt %, 40 wt % to 60 wt %, 45 wt % to 50 wt %, 45 wt % to 55 wt %, 45 wt % to 60 wt %, 50 wt % to 60 wt %, 50 wt % to 55 wt % or 55 wt % to 60 wt %, based on the weight of the reaction mixture. Generally, the reaction mixture contains less than 60 wt % monomer mixture. For example, the reaction mixtures provided herein can contain an amount of monomer mixture that is at least or about at least 1 wt %, 3 wt %, 5 wt %, 7 wt %, 10 wt %, 12 wt %, 15 wt %, 17 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 40 wt %, 42 wt %, 45 wt %, 48 wt %, 50 wt %, 55 wt % or 60 wt % based on the weight of the reaction mixture.

The mixture of catalysts can be pre-mixed in a separate mixing vessel before adding to the reaction vessel and can include polymerization initiators. The polymerization initiators can be, for example, organic peroxide catalysts. Exemplary organic peroxide catalysts include dialkyl peroxides, di-t-alkyl peroxides, diacyl peroxides, dialkyl peroxydicarbamates, t-alkyl peroxyesters and di-t-alkyl peroxyketals. Preferred polymerization initiators are the dialkyl peroxides, such as t-butyl peroctoate and t-butyl peroxybenzoate. The polymerization initiators can be free radical initiators.

Exemplary free radical initiators include azo initiators. A preferred azo initiator is, for example, Vazo® 67 (DuPont, Wilmington, Del.). The catalyst mixture can contain one or more than one polymerization initiator. For example, the mixture of catalysts can be a mixture of organic peroxide catalysts. Exemplary organic peroxide catalysts that can be used in the synthesis of acrylic core polymers provided herein are t-butyl peroctoate and t-butyl peroxybenzoate. The ratio of t-butyl peroctoate to t-butyl peroxybenzoate can be or can be about 10:1, 9:1, 8:1, 7:1, 6:1, 5:1, 4:1, 3:1, 2:1, 1.5:1, 1.3:1, 1.1:1 or 1:1 or less. The organic peroxide catalysts can be used alone or in combination.

The mixture of catalysts can be pre-mixed in an essentially non-aqueous continuous phase solvent, for example, the same essentially non-aqueous continuous phase solvent present in the reaction vessel used in the synthesis of the acrylic core polymer, which is discussed above. Generally, the hydrocarbon solvent has a sulfur content at or below 500 ppm. Exemplary continuous phase solvents that can be used to synthesize the acrylic core polymers provided herein include hydrotreated light naphthenic distillates, particularly Nytex® 5130.

After the mixture of acrylic monomers and mixture of catalysts are added to the reaction vessel at between or about between 85° C. to 140° C., such as at or about at 85° C., 90° C., 95° C., 100° C., 105° C., 110° C., 115° C., 120° C., 125° C., 130° C., 135° C. or 140° C. over a period of time of between 1 to 5 hours, e.g., 1, 2, 3, 4 or 5 hours, such as over at or about 3 hours, the inert gas can be changed to air and the reaction vessel can be held at 120° C. or about 120° C. for 1 hour or about 1 hour.

A second or supplemental mixture of catalysts then can be added to the reaction vessel. The second mixture of catalysts can be pre-mixed in a separate mixing vessel and can include additional polymerization initiators. For example, the additional polymerization initiators can be the same polymerization initiators used in the first catalyst mixture. The additional polymerization initiators can be a mixture of catalysts, such as t-butyl peroctoate and t-butyl peroxybenzoate. For example, a second mixture of catalysts can be added in an amount of up to 5 wt % or about 5 wt %, such as 0.1 wt %, 0.25 wt %, 0.5 wt %, 0.75 wt %, 1 wt %, 1.5 wt %, 2 wt %, 2.5 wt %, 3 wt %, 3.5 wt %, 4 wt %, 4.5 wt % or 5 wt % based on the weight of the reaction mixture.

The supplemental mixture of catalysts can be added slowly, for example the mixture can be added drop-wise to the reaction vessel. The reaction vessel then can be held for a period of time at the same temperature, for example at a temperature between or about between 85° C. and 140° C., such as at or about 85° C., 90° C., 95° C., 100° C., 105° C., 110° C., 115° C., 120° C., 125° C., 130° C., 135° C. or 140° C. The period of time that the first reaction vessel can be held can vary from between 1 and 4 hours, such as 1, 2, 3 or 4 hours. For example, the reaction can be allowed to proceed for 3 hours or for about 3 hours.

After the supplemental mixture of catalysts is added and held in the first reaction vessel for the period of time, such as 3 hours, the viscosity of the composition in the reaction vessel can be adjusted. For example, the viscosity can be increased by slowly adding one or more rheology adjusting components, such as, for example, water, an alcohol, an alkali compound, an amine or a combination thereof, to the reaction vessel. Addition of the rheology adjusting component can increase the viscosity of the resulting NAD such that addition of a relatively large amount of the NAD, such as 15 wt % to 60 wt % based on the weight of the overprint varnish, to an overprint varnish will not adversely affect the desired viscosity range of the overprint varnish.

The rheology adjusting component can be an alcohol. For example, the alcohol can be a $C_1$-$C_6$ alcohol, such as isopropanol (isopropyl alcohol), butanol, ethanol or methanol. The rheology adjusting component can also include an alkali compound. Suitable alkali compounds that can be used as or in the rheology adjusting component include metal hydroxides. Exemplary metal hydroxides include potassium hydroxide, sodium hydroxide and calcium hydroxide. Exemplary amines that can be used as or in the rheology adjusting component can be a primary amine (e.g., ethyl amine), secondary amine (e.g., diethylamine) or tertiary amine (e.g., triethylamine). For example, a rheology adjusting component can contain a mixture of water, an alcohol, an alkali compound and an amine. An exemplary rheology adjusting component contains water, potassium hydroxide, such as 85 wt % potassium hydroxide, isopropanol and diethylamine.

The rheology adjusting component generally contains water. Because the rheology adjusting component is added at a relatively high temperature, however, a large part of the water of the rheology adjusting component can be distilled off and removed, resulting in an essentially non-aqueous product. The resulting NAD product usually contains 2.0 wt % or less water, generally 1.0 wt % or less water, but also can contain 0.5 wt % or less water, based on the weight of the NAD composition. The resulting NAD product can contain an amount of water that is between 0.001 wt % to 1 wt %, 0.005 wt % to 0.5 wt %, or 0.025 wt % to 0.25 wt %, or 0.01 wt % to 0.1 wt % based on the weight of the composition. The resulting product also can be anhydrous.

A preferred mixture of constituents in the rheology adjusting component that can be used in the acrylic core polymers and NAD provided herein include water, potassium hydroxide, such as 85 wt % potassium hydroxide, isopropanol and diethylamine.

In the synthesis of the acrylic core polymers provided herein, the total amount of rheology adjusting component as a percentage (%) by weight of the reaction mixture (wt %) can be, for example, between from or about from 0.001 wt % to 2 wt %, such as 0.01 wt % to 0.1 wt %, 0.01 wt % to 0.2 wt %, 0.01 wt % to 0.3 wt %, 0.01 wt % to 0.4 wt %, 0.01 wt % to 0.5 wt %, 0.01 wt % to 0.6 wt %, 0.01 wt % to 0.7 wt %, 0.01 wt % to 0.8 wt %, 0.01 wt % to 0.9 wt %, 0.01 wt % to 1.0 wt %, 0.01 wt % to 1.1 wt %, 0.01 wt % to 1.2 wt %, 0.01 wt % to 1.3 wt %, 0.01 wt % to 1.4 wt %, 0.01 wt % to 1.5 wt %, 0.01 wt % to 1.6 wt %, 0.01 wt % to 1.7 wt %, 0.01 wt % to 1.8 wt %, 0.01 wt % to 1.9 wt %, 0.1 wt % to 0.2 wt %, 0.1 wt % to 0.3 wt %, 0.1 wt % to 0.4 wt %, 0.1 wt % to 0.5 wt %, 0.1 wt % to 1.0 wt %, 0.1 wt % to 1.5 wt %, 0.1 wt % to 2.0 wt %, 0.5 wt % to 1.0 wt %, 0.5 wt % to 1.1 wt %, 0.5 wt % to 1.2 wt %, 0.5 wt % to 1.3 wt %, 0.5 wt % to 1.4 wt %, 0.5 wt % to 1.5 wt %, 0.5 wt % to 1.6 wt %, 0.5 wt % to 1.7 wt %, 0.5 wt % to 1.8 wt %, 0.5 wt % to 1.9 wt %, 0.5 wt % to 2.0 wt %, 1.0 wt % to 1.1 wt %, 1.0 wt % to 1.2 wt %, 1.0 wt % to 1.3 wt %, 1.0 wt % to 1.4 wt %, 1.0 wt % to 1.5 wt %, 1.0 wt % to 1.6 wt %, 1.0 wt % to 1.7 wt %, 1.0 wt % to 1.8 wt %, 1.0 wt % to 1.9 wt %, 1.0 wt % to 2.0 wt %, 1.2 wt % to 1.3 wt %, 1.2 wt % to 1.4 wt %, 1.2 wt % to 1.5 wt %, 1.2 wt % to 1.6 wt %, 1.2 wt % to 1.7 wt %, 1.2 wt % to 1.8 wt %, 1.2 wt % to 1.9 wt %, 1.2 wt % to 2.0 wt %, 1.5 wt % to 1.6 wt %, 1.5 wt % to 1.7 wt %, 1.5 wt % to 1.8 wt %, 1.5 wt % to 1.9 wt %, 1.5 wt % to 2.0 wt %, 1.7 wt % to 1.8 wt %, 1.7 wt % to 1.9 wt %, 1.7 wt % to 2.0 wt %, 1.8 wt % to 2.0 wt % or 1.9 wt % to 2.0 wt %, by weight of the reaction mixture. Generally, the reaction mixture contains less than 2.0 wt % rheology adjusting component. For example, the reaction mixtures provided herein contain a rheology adjusting component in an amount that is at or about 0.01 wt %, 0.05 wt %, 0.1 wt %, 0.2 wt %, 0.25 wt %, 0.3 wt %, 0.4 wt %, 0.5 wt %, 0.6 wt %, 0.7 wt %, 0.75 wt %, 0.8 wt %, 0.9 wt %, 1.0 wt %, 1.1 wt %, 1.2 wt %, 1.25 wt %, 1.3 wt %, 1.4 wt %, 1.5 wt %, 1.6 wt %, 1.7 wt %, 1.75 wt %, 1.8 wt %, 1.9% or 2.0 wt % based on the weight of the reaction mixture. Because the rheology adjusting component, which generally contains water, can be added to the reaction vessel at high temperatures, e.g., between or about between 100° C. and 140° C., such as at or above 120° C. or at or above about 120° C., water from the rheology adjusting component can distill off during the reaction, thus reducing the total residual amount of water present in the acrylic core polymer and/or reaction mixture.

The rheology adjusting component can be pre-mixed in a separate mixing vessel and slowly added to the reaction vessel to control any foaming that can occur. After addition of the rheology adjusting component, the reaction vessel can be held at the same temperature, e.g., between or about between 100° C. and 140° C., for example at 120° C. or about 120° C., for 1 to 4 hours, e.g., 1, 1.5, 2, 2.5, 3, 3.5 or 4 hours, such as for 1 hour or about 1 hour.

The addition of the rheology adjusting component results in a NAD having increased viscosity when compared to a NAD prepared without the addition of a rheology adjusting component. NADs prepared without addition of the rheology adjusting component described herein have a fairly low viscosity. For example, without addition of the rheology adjusting component described herein, the viscosity of the resulting NAD can be less than 10 Pa·s at a shear rate of 50 sec$^{-1}$ (as measured on a TA Instruments AR 1000 rotational viscometer). Addition of the rheology adjusting component as described herein results in a NAD having a viscosity of at or about 10 Pa·s to at or about 150 Pa·s at a shear rate of 50 sec$^-$. The viscosity of the NAD can be greater than 10 Pa·s, 15 Pa·s, 20 Pa·s, 25 Pa·s, 30 Pa·s, 35 Pa·s, 40 Pa·s, 45 Pa·s, 50 Pa·s, 55 Pa·s, 60 Pa·s, 65 Pa·s, 70 Pa·s, 75 Pa·s, 80 Pa·s, 85 Pa·s, 90 Pa·s, 95 Pa·s, 100 Pa·s, 110 Pa·s, 120 Pa·s, 130 Pa·s, 140 Pa·s or 150 Pa·s at a shear rate of 50 sec$^-$. The viscosity of the NAD can be in a range of 10 Pa·s to 40 Pa·s, or 20 Pa·s to 50 Pa·s, or 30 Pa·s to 60 Pa·s, 40 Pa·s to 80 Pa·s, or 50 Pa·s to 90 Pa·s, or 60 Pa·s to 100 Pa·s, or 70 Pa·s to 120 Pa·s, or 80 Pa·s to 130 Pa·s, or 100 Pa·s to 150 Pa·s at a shear rate of 50 sec$^-$.

After addition of the rheology adjusting component and holding the reaction vessel at the elevated temperature, for example at 120° C. or about 120° C., for 1 hour or about 1 hour, the reaction vessel can be cooled to allow discharge of the resulting acrylic core/shell polymer, i.e., NAD. The reaction vessel can be cooled down to a temperature of 90° C. or about 90° C. The reaction vessel can be cooled down to a temperature of less than or equal to 85° C. or less than or equal to about 85° C.

The particle size of the acrylic core/shell polymer particles can impact the final properties of the overprint varnish after the NAD is added. Acrylic core/shell polymer particles that are too large can lead to a low gloss level of the overprint varnish, whereas acrylic core/shell polymer particles that are too small can have a negative impact on the immediate rub resistance and fast conversion properties of the overprint varnish.

Reaction conditions and reactants can influence primary particle size of the acrylic core/shell polymer particles. For example, reaction temperature during core/shell polymer formation has a measurable effect on core/shell polymer particle size. It has been observed that there is a correlation between increasing reaction temperature and decreasing the resulting core/shell polymer particle size. As the reaction temperature increases, the resulting acrylic core/shell polymer particle size decreases. It has been determined that reaction temperatures between or about between 85° C. and 140° C., such as at or about 85° C., 90° C., 95° C., 100° C., 105° C., 110° C., 115° C., 120° C., 125° C., 130° C., 135° C. or 140° C., for a period of time of between or about between 1 and 5 hours, such as 1, 1.5, 2, 2.5, 3, 3.5, 4, 4.5 or 5 hours, for example, 3 or 4 hours, generally results in an acrylic core/shell polymer where about 90% of the particles of the acrylic core/shell polymer are less than or about less than 3 microns. Particularly, at reaction temperatures of at or about 120° C. or higher, about 50% or more of the particles of the acrylic core/shell polymer are less than 1.5 microns.

A direct correlation exists between the amount of alkyl methacrylate monomer present in the acrylic core polymer and/or the acrylic shell polymer and particle size. As the amount of alkyl methacrylate monomer, particularly methyl methacrylate, in the acrylic core polymer and/or the acrylic shell polymer increases, the average particle size of the core/shell polymer particle increases, and thus higher methyl methacrylate levels favor larger particles.

The particle size and particle size distribution can be analyzed using any method known in the art. For example, a volume average particle size can be measured by using a Coulter Counter™ particle size analyzer (manufactured by Beckman Coulter Inc.). The median particle size also can be measured using conventional laser diffraction techniques. An exemplary laser diffraction technique uses a Mastersizer® 2000 particle size analyzer (Malvern Instruments LTD., Malvern, Worcestershire, United Kingdom), particularly a Hydro S small volume general-purpose automated sample dispersion unit. All functions of the particle counting can be controlled by the system software in either fully automatic operation via standard operating procedure directions or by manual operation via on-screen operating dialogues. In an exemplary method, the NAD sample to be evaluated is diluted with cyclohexane to disperse the particles and a refractive index of 1.55 is used. The sample is stirred at up to 3500 rpm after dilution of the sample to achieve an appropriate laser obscuration, particle size is measured using laser diffraction, generating a particle size distribution curve as well as data with respect to the volume median diameter, D(v,0.5), which is the diameter where 50% of the distribution is above and 50% is below, the D(v,0.9) value, where 90% of the volume distribution is below this value, and D(v,0.1), where 10% of the volume distribution is below this value. The span of the particle size also can be determined, based on the width of the distribution based on the 10%, 50% and 90% quantile.

The mean particle size also can be measured using a Zetasizer® Nano ZS device (Malvern Instruments LTD., Malvern, Worcestershire, United Kingdom) utilizing the Dynamic Light Scattering (DLS) method. The DLS method essentially consists of observing the scattering of laser light from particles, determining the diffusion speed and deriving the size from this scattering of laser light, using the Stokes-Einstein relationship.

An analysis of the particle size of the acrylic core/shell polymer particles in the NAD shows that typically 90% of the particles of the acrylic core/shell polymer in the NAD are less than 3 microns. Particularly, 50% of the particles of the acrylic core/shell polymer in the NAD are less than 1.5 microns or less than 1 micron. In some instances, greater than 50% of the particles of the acrylic core/shell polymer in the NAD are less than 1 micron. The average particle size of the acrylic core/shell polymer particles in the NAD can be in the range of at or about 300 nm to at or about 5000 nm (i.e., at or about 0.3 microns to at or about 5.0 microns). In particular, the average particle size of the acrylic core/shell polymer particles in the NAD can be in the range of at or about 300 nm to at or about 600 nm, at or about 400 nm to at or about 800 nm, at or about 500 nm to at or about 900 nm, at or about 600 nm to at or about 1200 nm, at or about 800 nm to at or about 1400 nm, at or about 1000 nm to at or about 2000 nm, at or about 1500 nm to at or about 2500 nm, at or about 2000 nm to at or about 3000 nm, at or about 2500 nm to at or about 3500 nm, or at or about 3000 nm to at or about 4500 nm.

The amounts of acrylic core polymer and acrylic shell polymer in the acrylic core/shell polymer were determined. Any method known in the art that can be used to determine the amounts of acrylic core polymer and acrylic shell polymer can be used. Spectrographic methods commonly are used in the art. For example, Wang et al. (eXPRESS Polymer Letters 4(11):670-680 (2010)) describes methods of characterizing core/shell polymers using Fourier transform infrared (IR) measurements. Fei et al. (Chalcogenide Letters 8(8):499-504 (2011)) describes spectral characterization of core/shell polymers using IR spectroscopic analysis. Auguiar et al. (Macromolecules 32(20):6767-6771 (1999)) describes characterization of core/shell polymers using transmission electron microscopy, dynamic mechanical thermal analysis light scattering, IR spectroscopy and differential scanning calorimetry. For IR spectrographic analysis, a Thermo Nicolet Magna 550 with a Golden Gate diamond crystal micro attenuated total reflection (ATR) device or an immersion transflectance probe can be used. For near IR spectroscopy (NIR), a Foss XDS NIR spectrometer can be used to analyze the polymer particles to determine the amount of acrylic core polymer and acrylic shell polymer present. Analysis also can include software for automation or reaction monitoring, such as the Foss XDS Interactance OptiProbe® Analyzer. Software known in the art can be used to assess the spectroscopic data. Exemplary software includes TQ Analyst (Thermo Fisher Scientific, Waltham, Mass.), Unscrambler® X (CAMO Software AS, Woodbridge, N.J.) and irAnalyze software (LabCognition, Ft. Myers, Fla.).

The acrylic core/shell polymer particles in the NAD can contain from at or about 15 wt % to at or about 75 wt % or from at or about 20 wt % to at or about 60 wt % acrylic core polymer based on the weight of the acrylic core/shell polymer particle. The acrylic core/shell polymer particles in the NAD can contain 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, 50 wt %, 51 wt %, 52 wt %, 53 wt %, 54 wt %, 55 wt %, 56 wt %, 57 wt %, 58 wt %, 59 wt %, 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, 73 wt %, 74 wt % or 75 wt % acrylic core polymer, based on the weight of the acrylic core/shell polymer.

The acrylic core/shell polymer particles in the NAD can contain from at or about 15 wt % to at or about 75 wt % or from at or about 20 wt % to at or about 60 wt % acrylic shell polymer based on the weight of the acrylic core/shell polymer particle. The acrylic core/shell polymer particles in the NAD can contain 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, 50 wt %, 51 wt %, 52 wt %, 53 wt %, 54 wt %, 55 wt %, 56 wt %, 57 wt %, 58 wt %, 59 wt %, 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, 73 wt %, 74 wt % or 75 wt % acrylic shell polymer, based on the weight of the acrylic core/shell polymer.

The acrylic core/shell polymer particles can have an average core-to-shell ratio of from at or about 0.60 to at or about 2.0. For example, an acrylic core/shell polymer particle containing 62.2% acrylic core polymer and 37.8% acrylic shell polymer has a core/shell ratio of about 1.65. An acrylic core/shell polymer particle containing 40% acrylic core polymer and 60% acrylic shell polymer has a core/shell ratio of about 0.67. The acrylic core/shell polymer particles can have an average core-to-shell ratio of from at or about 0.60 to at or about 1.65, at or about 0.97 to at or about 1.24, at or about 1.00 to at or about 1.70, or at or about 1.50 to at or about 1.90. Preferred core/shell ratios include ratios between 1.20 and 1.80, or between 1.30 and 1.70, or between 1.40 and 1.65 or between 1.55 and 1.75. The acrylic core/shell polymer particles of the NAD can have an average core-to-shell ratio of 1.0, 1.025, 1.05, 1.075, 1.1, 1.125, 1.15, 1.175, 1.2, 1.225 1.25, 1.275, 1.3, 1.325, 1.35, 1.375, 1.4, 1.425, 1.45, 1.475 1.5, 1.525, 1.55, 1.575, 1.6, 1.625, 1.65, 1.675 or 1.7.

The NAD composition can contain an essentially non-aqueous organic solvent. The essentially non-aqueous organic solvent can be present in an amount from at or about 15 wt % to at or about 35 wt % based on the weight of the acrylic core polymer present in the NAD and from at or about 15 wt % to at or about 35 wt % based on the weight of the acrylic shell polymer present in the NAD. The NAD can contain from at or about 30 wt % to at or about 70 wt % essentially non-aqueous organic solvent based on the weight of the NAD.

The NAD composition can contain a rheology adjusting component. An exemplary rheology adjusting component can contain water, an alcohol, an alkali compound, an amine or a mixture thereof. A preferred rheology adjusting component contains a mixture of water, potassium hydroxide, isopropanol and diethylamine. The ratio of alkali compound to amine can be between 0.66 to 1.5 or between 0.75 to 1.25. The ratio of water to amine can be between 2 to 16 or between 3 to 9. The ratio of water to alcohol can be between 3 to 15 or between 4 to 12.5.

The amount of rheology adjusting component can be present in the NAD composition in an amount from at or about 0.001 wt % to at or about 5 wt % based on the weight of the NAD composition. The NAD composition can contain 0.001 wt %, 0.005 wt %, 0.01 wt %, 0.025 wt %, 0.05 wt %, 0.075 wt %, 0.1 wt %, 0.2 wt %, 0.3 wt %, 0.4 wt %, 0.5 wt %, 0.6 wt %, 0.7 wt %, 0.8 wt %, 0.9 wt %, 1.0 wt %, 1.1 wt %, 1.2 wt %, 1.3 wt %, 1.4 wt %, 1.5 wt %, 1.6 wt %, 1.7 wt %, 1.8 wt %, 1.9 wt %, 2.0 wt %, 2.1 wt %, 2.2 wt %, 2.3 wt %, 2.4 wt %, 2.5 wt %, 2.6 wt %, 2.7 wt %, 2.8 wt %, 2.9 wt %, 3.0 wt %, 3.1 wt %, 3.2 wt %, 3.3 wt %, 3.4 wt %, 3.5 wt %, 3.6 wt %, 3.7 wt %, 3.8 wt %, 3.9 wt %, 3.0 wt %, 4.1 wt %, 4.2 wt %, 4.3 wt %, 4.4 wt %, 4.5 wt %, 4.6 wt %, 4.7 wt %, 4.8 wt %, 4.9 wt % or 5.0 wt % rheology adjusting component based on the weight of the NAD composition.

It should be noted that the aforementioned NAD and its synthesis and preparation represents a preferred embodiment in the present printing overprint varnish formulation, but it is understood that other methods of preparing a NAD, and traditionally prepared NADs, could be used alone or in combination with the aforementioned NAD to produce overprint varnish compositions having good printing and setting properties and exhibiting resistance to yellowing.

E. Overprint Varnishes

The NADs provided herein can be incorporated into overprint varnishes (OPVs). The NADs can be incorporated into traditional lithographic overprint varnishes, such as oil-based (i.e., non-aqueous) overprint varnishes. Alternatively, the NADs provided herein can be used as an overprint varnish, without incorporating into a traditional overprint varnish, such as a traditional overprint varnish containing a resin and a solvent. The OPV compositions provided herein, including OPV compositions composed solely of NAD (i.e., 100% NAD), can be used to coat a substrate. Often it is desirable to coat a substrate with an overprint varnish after the substrate has been printed in order to protect the printed image or text and increase the gloss, while at the same time minimizing the time needed before the coated print can be subject to further processing, such as cutting and stacking.

Provided are compositions and methods for improving the setting, drying and aging properties and appearance, as evidenced by gloss, improved rub resistance and resistance to yellowing, of lithographic overprint varnish compositions containing NAD. Including an amount of NAD, particularly of a NAD provided herein, in a traditional overprint varnish formulation, for example, an overprint varnish containing a resin and a solvent, that is at or about 10 wt % to 80 wt %, or 20 wt % to 60 wt %, or 40 wt % to 60 wt %, or 65 wt % to 80 wt %, or greater than 60 wt %, or greater than 70 wt %, or greater than 75 wt %, or greater than 80 wt % or more, based on the weight of the OPV composition, imparts sufficient setting and drying properties to the coated substrate, such that the coated substrate sets and dries in an acceptable time so that it can be subject to further processing shortly after coating. A composition containing 100% NAD can also be used to coat a substrate, without introducing the NAD into a traditional overprint varnish, such as an overprint varnish containing a resin and a solvent. As demonstrated in the Examples, OPV compositions containing from 10 wt % to 80 wt % or more NAD, or an OPV composition that is 100% NAD, exhibit desirable rub resistance values very soon after coating, such as at 15 minutes after coating, and high gloss and resistance to yellowing, that are equal to or better than comparative OPVs not containing any NAD. OPV compositions can be formulated to contain between 10 wt % to 80 wt % NAD, or greater than 60 wt % NAD, such as 65 wt %, 70 wt %, 75 wt %, 80 wt %, 85 wt %, 90 wt %, 95 wt %, or more, based on the weight of the OPV composition. 100% NAD can be used an on OPV. Such compositions exhibit good setting and drying properties, particularly as measured by rub resistance, and desirable aging and appearance properties, particularly as measured by gloss and yellowing resistance.

The overprint varnishes containing a NAD provided herein can contain a resin and a solvent. An exemplary overprint varnish used in the compositions and methods provided herein is Topfinish™ TPF90 (Sun Chemical Corporation, Parsippany, N.J.). The overprint varnishes containing a NAD provided herein can contain only NAD. An exemplary overprint varnish used in the compositions and methods provided herein contains 100% NAD.

The OPV containing NAD can contain a resin. Any resin known in the art can be included in the OPV, for example, natural resins or processed resins. Suitable resins for use in the OPV compositions provided herein include rosin, copal, shellac, hardened rosin and rosin esters; rosin resins; synthetic resins such as phenol resin, 100% phenol resin, rosin modified phenol resin, rosin esters, modified rosin esters, maleic acid resin, maleic modified resins, rosin modified fumaric resins, dimerized and polymerized rosins, alkyd resin, epoxy modified alkyd resin, soya/linseed oil alkyd resins, petroleum resin, vinyl resin, acrylic resin, polyamide resin, epoxy resin, aminoalkyd resin, polyurethane resin and aminoplastic resin; cellulose derivatives such as nitrocellulose and ethyl cellulose; terpenes, polyamides, cyclized rubber, acrylics, hydrocarbons and modified hydrocarbons. Also included among the available resins are those identified in The Printing Ink Manual (5$^{th}$ ed., Leach et al., eds. (2009)).

In the OPV compositions containing NAD provided herein, the total resin content of the OPV composition can be in a range of from at or about 0 wt % to at or about 90 wt %, for example between or about between 0 wt % to 90 wt %, 5 wt % to 90 wt %, 10 wt % to 90 wt %, 15 wt % to 90 wt %, 20 wt % to 90 wt %, 25 wt % to 90 wt %, 30 wt % to 90 wt %, 35 wt % to 90 wt %, 40 wt % to 90 wt %, 45 wt % to 90 wt %, 50 wt % to 90 wt %, 55 wt % to 90 wt %, 60 wt % to 90 wt %, 65 wt % to 90 wt %, 70 wt % to 90 wt %, 75 wt % to 90 wt %, 80 wt % to 90 wt %, 85 wt % to 90 wt %, 0 wt % to 80 wt %, 5 wt % to 80 wt %, 10 wt % to 80 wt %, 15 wt % to 80 wt %, 20 wt % to 80 wt %, 25 wt % to 80 wt %, 30 wt % to 80 wt %, 35 wt % to 80 wt %, 40 wt % to 80 wt %, 45 wt % to 80 wt %, 50 wt % to 80 wt %, 55 wt % to 80 wt %, 60 wt % to 80 wt %, 65 wt % to 80 wt %, 70 wt % to 80 wt %, 75 wt % to 80 wt %, 0 wt % to 70 wt %, 5 wt % to 70 wt %, 10 wt % to 70 wt %, 15 wt % to 70 wt %, 20 wt % to 70 wt %, 25 wt % to 70 wt %, 30 wt % to 70 wt %, 35 wt % to 70 wt %, 40 wt % to 70 wt %, 45 wt % to 70 wt %, 50 wt % to 70 wt %, 55 wt % to 70 wt %, 60 wt % to 70 wt %, 65 wt % to 70 wt %, 0 wt % to 60 wt %, 5 wt % to 60 wt %, 10 wt % to 60 wt %, 15 wt % to 60 wt %, 20 wt % to 60 wt %, 25 wt % to 60 wt %, 30 wt % to 60 wt %, 35 wt % to 60 wt %, 40 wt % to 60 wt %, 45 wt % to 60 wt %, 50 wt % to 60 wt %, 55 wt % to 60 wt %, 0 wt % to 55 wt %, 5 wt % to 55 wt %, 10 wt % to 55 wt %, 15 wt % to 55 wt %, 20 wt % to 55 wt %, 25 wt % to 55 wt %, 30 wt % to 55 wt %, 35 wt % to 55 wt %, 40 wt % to 55 wt %, 45 wt % to 55 wt %, 50 wt % to 55 wt %, 0 wt % to 50 wt %, 5 wt % to 50 wt %, 10 wt % to 50 wt %, 15 wt % to 50 wt %, 20 wt % to 50 wt %, 25 wt % to 50 wt %, 30 wt % to 50 wt %, 35 wt % to 50 wt %, 40 wt % to 50 wt %, 45 wt % to 50 wt %, 0 wt % to 45 wt %, 5 wt % to 45 wt %, 10 wt % to 45 wt %, 15 wt % to 45 wt %, 20 wt % to 45 wt %, 25 wt % to 45 wt %, 30 wt % to 45 wt %, 35 wt % to 45 wt %, 40 wt % to 45 wt %, 0 wt % to 40 wt %, 5 wt % to 40 wt %, 10 wt % to 40 wt %, 15 wt % to 40 wt %, 20 wt % to 40 wt %, 25 wt % to 40 wt %, 30 wt % to 40 wt %, 35 wt % to 40 wt %, 0 wt % to 35 wt %, 5 wt % to 35 wt %, 10 wt % to 35 wt %, 15 wt % to 35 wt %, 20 wt % to 35 wt %, 25 wt % to 35 wt %, 30 wt % to 35 wt %, 0 wt % to 30 wt %, 5 wt % to 30 wt %, 10 wt % to 30 wt %, 15 wt % to 30 wt %, 20 wt % to 30 wt %, 25 wt % to 30 wt %, 0 wt % to 25 wt %, 5 wt % to 25 wt %, 10 wt % to 25 wt %, 15 wt % to 25 wt %, 20 wt % to 25 wt %, 0 wt % to 20 wt %, 5 wt % to 20 wt %, 10 wt % to 20 wt %, 15 wt % to 20 wt %, 0 wt % to 15 wt %, 5 wt % to 15 wt %, 10 wt % to 15 wt %, 0 wt % to 10 wt %, 5 wt % to 10 wt % or 0 wt % to 5 wt %, based on the weight of the OPV composition containing NAD.

The OPV containing NAD can contain solvent, such as a non-aqueous solvent. The non-aqueous solvent can be, for example, any solvent that can dissolve or solvate the selected resin. Suitable solvents for use in the OPV compositions provided herein are a mineral oil, such as a light mineral oil or a heavy mineral oil, a naphthenic oil, a paraffinic oil, hydrocarbons, such as $C_{12}$-$C_{14}$ or $C_{11}$-$C_{14}$ or $C_{12}$-$C_{16}$ or $C_{14}$-$C_{18}$ n-alkanes, isoalkanes, cyclics or aromatics, or combinations of these solvents thereof.

In the OPV compositions containing NAD provided herein, the total solvent content of the OPV composition can be in a range of from at or about 0 wt % to at or about 90 wt %, for example between or about between 0 wt % to 90 wt %, 5 wt % to 90 wt %, 10 wt % to 90 wt %, 15 wt % to 90 wt %, 20 wt % to 90 wt %, 25 wt % to 90 wt %, 30 wt % to 90 wt %, 35 wt % to 90 wt %, 40 wt % to 90 wt %, 45 wt % to 90 wt %, 50 wt % to 90 wt %, 55 wt % to 90 wt %, 60 wt % to 90 wt %, 65 wt % to 90 wt %, 70 wt % to 90 wt %, 75 wt % to 90 wt %, 80 wt % to 90 wt %, 85 wt % to 90 wt %, 0 wt % to 80 wt %, 5 wt % to 80 wt %, 10 wt % to 80 wt %, 15 wt % to 80 wt %, 20 wt % to 80 wt %, 25 wt % to 80 wt %, 30 wt % to 80 wt %, 35 wt % to 80 wt %, 40 wt % to 80 wt %, 45 wt % to 80 wt %, 50 wt % to 80 wt %, 55 wt % to 80 wt %, 60 wt % to 80 wt %, 65 wt % to 80 wt %, 70 wt % to 80 wt %, 75 wt % to 80 wt %, 0 wt % to 70 wt %, 5 wt % to 70 wt %, 10 wt % to 70 wt %, 15 wt % to 70 wt %, 20 wt % to 70 wt %, 25 wt % to 70 wt %, 30 wt % to 70 wt %, 35 wt % to 70 wt %, 40 wt % to 70 wt %, 45 wt % to 70 wt %, 50 wt % to 70 wt %, 55 wt % to 70 wt %, 60 wt % to 70 wt %, 65 wt % to 70 wt %, 0 wt % to 60 wt %, 5 wt % to 60 wt %, 10 wt % to 60 wt %, 15 wt % to 60 wt %, 20 wt % to 60 wt %, 25 wt % to 60 wt %, 30 wt % to 60 wt %, 35 wt % to 60 wt %, 40 wt % to 60 wt %, 45 wt % to 60 wt %, 50 wt % to 60 wt %, 55 wt % to 60 wt %, 0 wt % to 55 wt %, 5 wt % to 55 wt %, 10 wt % to 55 wt %, 15 wt % to 55 wt %, 20 wt % to 55 wt %, 25 wt % to 55 wt %, 30 wt % to 55 wt %, 35 wt % to 55 wt %, 40 wt % to 55 wt %, 45 wt % to 55 wt %, 50 wt % to 55 wt %, 0 wt % to 50 wt %, 5 wt % to 50 wt %, 10 wt % to 50 wt %, 15 wt % to 50 wt %, 20 wt % to 50 wt %, 25 wt % to 50 wt %, 30 wt % to 50 wt %, 35 wt % to 50 wt %, 40 wt % to 50 wt %, 45 wt % to 50 wt %, 0 wt % to 45 wt %, 5 wt % to 45 wt %, 10 wt % to 45 wt %, 15 wt % to 45 wt %, 20 wt % to 45 wt %, 25 wt % to 45 wt %, 30 wt % to 45 wt %, 35 wt % to 45 wt %, 40 wt % to 45 wt %, 0 wt % to 40 wt %, 5 wt % to 40 wt %, 10 wt % to 40 wt %, 15 wt % to 40 wt %, 20 wt % to 40 wt %, 25 wt % to 40 wt %, 30 wt % to 40 wt %, 35 wt % to 40 wt %, 0 wt % to 35 wt %, 5 wt % to 35 wt %, 10 wt % to 35 wt %, 15 wt % to 35 wt %, 20 wt % to 35 wt %, 25 wt % to 35 wt %, 30 wt % to 35 wt %, 0 wt % to 30 wt %, 5 wt % to 30 wt %, 10 wt % to 30 wt %, 15 wt % to 30 wt %, 20 wt % to 30 wt %, 25 wt % to 30 wt %, 0 wt % to 25 wt %, 5 wt % to 25 wt %, 10 wt % to 25 wt %, 15 wt % to 25 wt %, 20 wt % to 25 wt %, 0 wt % to 20 wt %, 5 wt % to 20 wt %, 10 wt % to 20 wt %, 15 wt % to 20 wt %, 0 wt % to 15 wt %, 5 wt % to 15 wt %, 10 wt % to 15 wt %, 0 wt % to 10 wt %, 5 wt % to 10 wt % or 0 wt % to 5 wt %, based on the weight of the OPV composition containing NAD.

The amount of NAD that can be incorporated into an overprint varnish composition can vary between 10 wt % to 100 wt % based on the weight of the OPV composition. The NAD can be incorporated into the overprint varnish composition in a range of from at or about 10 wt % to at or about 100 wt %, for example between or about between 10 wt % to 100 wt %, 15 wt % to 100 wt %, 20 wt % to 100 wt %, 25 wt % to 100 wt %, 30 wt % to 100 wt %, 35 wt % to 100 wt %, 40 wt % to 100 wt %, 45 wt % to 100 wt %, 50 wt % to 100 wt %, 55 wt % to 100 wt %, 60 wt % to 100 wt %, 65 wt % to 100 wt %, 70 wt % to 100 wt %, 75 wt % to 100 wt %, 80 wt % to 100 wt %, 85 wt % to 100 wt %, 90 wt % to 100 wt %, 95 wt % to 100 wt %, 10 wt % to 95 wt %, 15 wt % to 95 wt %, 20 wt % to 95 wt %, 25 wt % to 95 wt %, 30 wt % to 95 wt %, 35 wt % to 95 wt %, 40 wt % to 95 wt %, 45 wt % to 95 wt %, 50 wt % to 95 wt %, 55 wt % to 95 wt %, 60 wt % to 95 wt %, 65 wt % to 95 wt %, 70 wt % to 95 wt %, 75 wt % to 95 wt %, 80 wt % to 95 wt %, 85 wt % to 95 wt %, 90 wt % to 95 wt %, 10 wt % to 90 wt %, 15 wt % to 90 wt %, 20 wt % to 90 wt %, 25 wt % to 90 wt %, 30 wt % to 90 wt %, 35 wt % to 90 wt %, 40 wt % to 90 wt %, 45 wt % to 90 wt %, 50 wt % to 90 wt %, 55 wt % to 90 wt %, 60 wt % to 90 wt %, 65 wt % to 90 wt %, 70 wt % to 90 wt %, 75 wt % to 90 wt %, 80 wt % to 90 wt %, 85 wt % to 90 wt %, 10 wt % to 80 wt %, 15 wt % to 80 wt %, 20 wt % to 80 wt %, 25 wt % to 80 wt %, 30 wt % to 80 wt %, 35 wt % to 80 wt %, 40 wt % to 80 wt %, 45 wt % to 80 wt %, 50 wt % to 80 wt %, 55 wt % to 80 wt %, 60 wt % to 80 wt %, 65 wt % to 80 wt %, 70 wt % to 80 wt %, 75 wt % to 80 wt %, 10 wt % to 70 wt %, 15 wt % to 70 wt %, 20 wt % to 70 wt %, 25 wt % to 70 wt %, 30 wt % to 70 wt %, 35 wt % to 70 wt %, 40 wt % to 70 wt %, 45 wt % to 70 wt %, 50 wt % to 70 wt %, 55 wt % to 70 wt %, 60 wt % to 70 wt %, 65 wt % to 70 wt %, 10 wt % to 60 wt %, 15 wt % to 60 wt %, 20 wt % to 60 wt %, 25 wt % to 60 wt %, 30 wt % to 60 wt %, 35 wt % to 60 wt %, 40 wt % to 60 wt %, 45 wt % to 60 wt %, 50 wt % to 60 wt %, 55 wt % to 60 wt %, 10 wt % to 55 wt %, 15 wt % to 55 wt %, 20 wt % to 55 wt %, 25 wt % to 55 wt %, 30 wt % to 55 wt %, 35 wt % to 55 wt %, 40 wt % to 55 wt %, 45 wt % to 55 wt %, 50 wt % to 55 wt %, 10 wt % to 50 wt %, 15 wt % to 50 wt %, 20 wt % to 50 wt %, 25 wt % to 50 wt %, 30 wt % to 50 wt %, 35 wt % to 50 wt %, 40 wt % to 50 wt %, 45 wt % to 50 wt %, 10 wt % to 45 wt %, 15 wt % to 45 wt %, 20 wt % to 45 wt %, 25 wt % to 45 wt %, 30 wt % to 45 wt %, 35 wt % to 45 wt %, 40 wt % to 45 wt %, 10 wt % to 40 wt %, 15 wt % to 40 wt %, 20 wt % to 40 wt %, 25 wt % to 40 wt %, 30 wt % to 40 wt %, 35 wt % to 40 wt %, 10 wt % to 35 wt %, 15 wt % to 35 wt %, 20 wt % to 35 wt %, 25 wt % to 35 wt %, 30 wt % to 35 wt %, 10 wt % to 30 wt %, 15 wt % to 30 wt %, 20 wt % to 30 wt %, 25 wt % to 30 wt %, 10 wt % to 25 wt %, 15 wt % to 25 wt %, 20 wt % to 25 wt %, 10 wt % to 20 wt %, 15 wt % to 20 wt %, or 10 wt % to 15 wt %, based on the weight of the OPV composition containing NAD.

The NAD can be present in the OPV composition in an amount that is greater than at or about at 10 wt %, 15 wt %, 20 wt %, 25 wt %, 30 wt %, 35 wt %, 40 wt %, 45 wt %, 50 wt %, 55 wt %, 60 wt %, 65 wt %, 70 wt %, 75 wt %, 80 wt %, 85 wt %, 90 wt %, or 95 wt %, based on the weight of the OPV composition.

The amount of resin, solvent and NAD in the OPV compositions provided herein and the proportion of resin and solvent to NAD can routinely be selected in order to obtain desirable properties that are important for substrates coated with an overprint varnish, particularly printed substrates, such as, e.g., rub resistance, gloss, and resistance to yellowing.

It has been found that an overprint varnish composition containing NAD, particularly containing between or about between 10 wt % and 100 wt % NAD based on the weight of the OPV composition such as greater than 10 wt %, 15 wt %, 20 wt %, 25 wt %, 30 wt %, 35 wt %, 40 wt %, 45 wt %, 50 wt %, 55 wt %, 60 wt %, 65 wt %, 70 wt %, 75 wt %, 80 wt %, 85 wt %, 90 wt %, or 95 wt %, exhibits desirable setting properties, as exhibited by increased rub resistance 15 minutes after coating a substrate as compared to the same overprint varnish not containing any NAD (i.e., 0% NAD). Rub resistance can be measured after the substrate has been coated with the overprint varnish composition and allowed to dry, such as after drying for or about for 15 minutes, 30 minutes, 1 hour, 2 hours, 12 hours, or longer. The substrate can be allowed to air dry. In some embodiments the substrate can be an unprinted substrate. In other embodiments the substrate can be printed on with ink and allowed to dry before it is coated with the OPV containing NAD.

Rub resistance values can be measured by any method known to those of skill in the art. An exemplary method includes assessing the rub resistance values with a Sutherland device testing instrument, such as a Sutherland® ink rub tester equipped with a 910 g weight. The coated substrate can be fixed to the moving device, whereas the uncoated substrate is adhered to the still surface. Rub test results can be assessed visually and assigned a number from 0 to 10 based on the amount of ink that rubs off during the test. A lower rating, for example a rating of 0, generally indicates no visual rub-off detected, whereas a high rating, such as a rating of 10, generally indicates severe rub off. A pigment can be added to the OPV composition before coating the substrate for visualization during the rub resistance testing. For example, 1% or about 1% of a pigment, such as a flush pigment, can be added to the OPV composition before coating the substrate to tint the OPV composition in order to make the potential rub-off visible for analytical purposes.

It has also been found that an overprint varnish composition containing NAD, particularly containing between or about between 10 wt % and 100 wt % NAD, including greater than 20 wt %, 30 wt %, 40 wt %, 50 wt %, 60 wt %, 65 wt %, 70 wt %, 75 wt %, 80 wt %, 85 wt %, 90 wt % or 95 wt %, based on the weight of the OPV composition, exhibits increased resistance to yellowing. Resistance to yellowing is a widely recognized technical advantage in the printing industry, as it allows prints to more closely hold their original appearance. Resistance to yellowing can be determined by measuring yellowing values 15 minutes after coating a substrate with an OPV composition and then again after exposing the coated substrate to accelerated aging. Accelerated aging of a substrate can be performed, for example, in an oven, such as an oven at an elevated temperature, e.g., at or about at 40° C., 50° C., 60° C., 70° C., 80° C., 90° C., 100° C., or higher. The substrate can be placed in the oven for an extended period of time, for example, for or about for 1 day, 2 days, 3 days, 4 days, 5 days, 6 days, 1 week, or longer. In an exemplary embodiment, a substrate coated with an OPV composition is placed in an oven at or about at 60° C. for or about for 3 days.

Resistance to yellowing can be measured by any method known to those of skill in the art, such as any spectrophotometric method. An exemplary method includes obtaining Hunter L,a,b color scale values (LAB values), particularly assessing the B values with a SpectroEye™ device from GretagMacBeth. Hunter L,a,b (LAB) values can be obtained for substrates coated with an OPV composition provided herein and compared to substrates coated with the same OPV composition not containing any NAD (i.e., 0% NAD). Yellowing can be determined from changes in the B values.

For example, the values can be determined shortly after coating the substrate, such as 15 minutes after coating, and again after accelerated aging, such as after placing the coated substrate in an oven at 60° C. for 3 days. In some embodiments the substrate can be an unprinted substrate. In other embodiments the substrate can be printed on with ink and allowed to dry before it is coated with the OPV containing NAD.

Delta B values can be determined by calculating the difference between the B value obtained initially and the B value obtained after accelerated aging. The delta B value indicates the degree of yellowing after heat-aging, for example, a lower delta B value corresponds to lower yellowing.

Overprint varnish compositions containing NAD, particularly containing between or about between 10 wt % and 100 wt % NAD, including greater than 20 wt %, 30 wt %, 40 wt %, 50 wt %, 60 wt %, 65 wt %, 70 wt %, 75 wt %, 80 wt %, 85 wt %, 90 wt % or 95 wt % NAD based on the weight of the OPV composition, exhibit desirable gloss values. The OPV compositions provided herein generally tend to increase gloss values on printed areas of a coated substrate while subsequently decreasing gloss values on unprinted areas. Gloss values and particularly gloss contrast values (i.e., the difference in gloss values between the printed area coated with an OPV compared to the unprinted area coated with the OPV) are important in the printing industry. An increased gloss contrast between a printed area exhibiting high gloss and an unprinted area exhibiting low gloss could provide an important optical advantage for brand owners as the increased gloss could highlight the images in the printed areas. These highlighted images could represent, for example, brand or product names and may help create an attractive product or package design.

Gloss values can be measured after coating a substrate with an OPV composition, for example, after 15 minutes, 30 minutes, 1 hour, 2 hours, 12 hours, 24 hours, or longer. The gloss values of a substrate coated with an OPV containing NAD can be compared to the gloss values of a substrate coated with the same OPV not containing any NAD (i.e., 0% NAD).

Gloss values can be measured by any method known to those of skill in the art. An exemplary method includes using an opacity chart. An opacity chart can be created, for example, by printing a thick black stripe consisting of two layers of black, sheetfed lithographic ink across the width of a substrate, for example, gloss paper stock, and subsequently dried. The black printed area (i.e., the "printed area") is positioned in the middle of the substrate and can encompass a portion of the total area of the substrate, for example approximately one-third of the total area of the substrate. On either side of the printed area are the "unprinted areas" (i.e., bare stock), each can encompass another portion of the substrate, for example, each can encompass approximately one-third of the area of the substrate. The opacity chart can be used to compare the gloss of the OPVs containing NAD printed over the printed areas vs. unprinted areas. The gloss measurements can be obtained using any instrument that can measure gloss, for example, a Micro-TRI-gloss device (BYK Gardner). In some embodiments the measurement angle can be set at 60°. The gloss readings can be taken a period of time after coating, for example, after or about after 12 hours, 24 hours, 48 hours, or longer after coating. The measurements can be averaged.

Any substrate that can accept a coating of an overprint varnish can be used with compositions and methods provided herein. For example, the substrate can be paper or paper stock or board-stock. The substrate can be paper stock, for example, coated paper stock, such as gloss coated paper, having a weight of at least or about at least 100 g/m$^2$, for example a weight of greater than 100 g/m$^2$, such as a paper having a weight range of between or about between 100 g/m$^2$ to 225 g/m$^2$, for example a weight of 115 g/m$^2$ or 200 g/m$^2$. Exemplary substrates included gloss coated paper from Sappi (Magnostar® 115 g/m$^2$) and Igepa (Maxigloss 200 g/m$^2$). The substrate can free from ink or images before the OPV composition is applied, i.e., the OPV composition is applied directly over the substrate. Alternatively, the OPV composition can be applied over a coating or layer previously applied to the substrate. For example, the substrate can first be printed on, for example, with ink, before the OPV composition is applied.

Provided are methods for printing on a substrate by preparing an overprint varnish composition containing NAD, such as an OPV composition containing between or about between 10 wt % to 100 wt % NAD, including greater than 20 wt %, 30 wt %, 40 wt %, 50 wt %, 60 wt %, 65 wt %, 70 wt %, 75 wt %, 80 wt %, 85 wt %, 90 wt % or 95 wt % NAD, based on the weight of the composition, and coating the substrate with the OPV composition using a lithographic printing process. In some methods, the substrate can be printed on with ink before applying the OPV composition.

Also provided are substrates coated with an OPV composition, using a method that includes preparing an overprint varnish composition containing NAD, such as an OPV composition containing between or about between 10 wt % to 100 wt % NAD, including greater than 20 wt %, 30 wt %, 40 wt %, 50 wt %, 60 wt %, 65 wt %, 70 wt %, 75 wt %, 80 wt %, 85 wt %, 90 wt % or 95 wt % NAD, based on the weight of the composition, and coating the substrate with the OPV composition using a lithographic printing process. In some methods, the substrate can be printed on with ink before applying the OPV composition.

F. Examples

The following examples illustrate specific aspects of the present invention and are not intended to limit the scope thereof in any respect and should not be so construed.

Example 1

An exemplary non-aqueous dispersion (NAD) of an acrylic core/shell polymer was prepared. The shell polymer was synthesized first, and contained the ingredients listed below in Table 1.

TABLE 1

| | | Shell polymer ingredients | |
|---|---|---|---|
| | | Material | wt % |
| MP | A | Nytex ® 5130 | 34.03 |
| | B | Isobutyl methacrylate | 39.25 |
| | C | Dodecyl methacrylate | 13.50 |
| | D | Acrylic acid | 1.07 |
| CP | E | Nytex ® 5130 | 9.79 |
| | F | t-Butyl peroctoate (50% conc.) | 0.83 |
| | G | t-Butyl peroxybenzoate | 0.11 |
| | H | t-Butyl peroctoate (50% conc.) | 0.42 |
| | I | Water | 0.75 |

TABLE 1-continued

Shell polymer ingredients

| | Material | wt % |
|---|---|---|
| J | KOH (85%) | 0.09 |
| K | Isopropylalcohol | 0.06 |
| L | Diethylamine | 0.10 |
| | TOTAL (wt %) | 100.00 |

A shell polymer that contained the ingredients listed in Table 1 above was synthesized according to the following protocol. The continuous phase solvent Nytex® 5130 (Ingredient A), a common hydrocarbon solvent, was added to a reactor, heated to 120° C. and held under nitrogen gas. Ingredients B, C and D were pre-mixed to form a monomer pre-mixture (MP). Ingredients E, F and G were pre-mixed to form a catalyst pre-mixture (CP). Pre-mixtures MP and CP were then concurrently added from separate feeds to the reactor over the course of 4 hours and held at 120° C. for 4 hours. The nitrogen gas was then changed to air and the reaction was held for 1 hour at 120° C. Ingredient H then was added to the reaction vessel and the temperature was held at 120° C. for an additional 2 hours. Ingredients I, J, K and L were pre-mixed in a separate vessel and were then slowly added to the reaction mixture under reflux conditions. Any foaming that occurred was controlled by adjusting the addition rate. After the addition was complete, the reaction vessel was held for 1 hour at 120° C. and then cooled down to 90° C. to allow discharge of the resulting product (shell polymer). The resulting shell polymer was made up of a copolymer of isobutyl methacrylate and dodecyl methacrylate in a ratio of approximately 3:1.

An acrylic core polymer was then synthesized, followed by formation of the final NAD, using the materials described below in Table 2.

TABLE 2

Acrylic core polymer and NAD ingredients

| | | Material | wt % |
|---|---|---|---|
| | A | Nytex® 5130 | 32.00 |
| | B | Shell polymer (Table 1) | 32.04 |
| MP | C | Methylmethacrylate | 15.73 |
| | D | n-Butyl methacrylate | 5.32 |
| | E | n-Butyl acrylate | 6.23 |
| CP1 | F | Nytex® 5130 | 6.50 |
| | G | t-Butyl peroctoate (50% conc.) | 0.51 |
| | H | t-Butyl peroxybenzoate | 0.25 |
| CP2 | I | t-Butyl peroctoate (50% conc.) | 0.28 |
| | J | t-Butyl peroxybenzoate | 0.14 |
| | K | Water | 0.75 |
| | L | KOH (85%) | 0.09 |
| | M | Isopropylalcohol | 0.06 |
| | N | Diethylamine | 0.1 |
| | | TOTAL (wt %) | 100.00 |

The components for synthesis of the acrylic core polymer included a monomer pre-mixture (MP), a catalyst pre-mixture 1 (CP1) and a catalyst pre-mixture 2 (CP2). The acrylic core polymer was formed in the presence of the acrylic shell polymer (Component B, described above in Table 1) in the continuous phase which contained the essentially non-aqueous organic solvent (Component A, Nytex® 5130). The acrylic core polymer was insoluble in the continuous phase of the essentially non-aqueous solvent but was soluble in the acrylic shell polymer. The acrylic shell polymer was soluble in the continuous phase of the essentially non-aqueous solvent due to the long hydrocarbon chains on the monomers and formed particles of acrylic core/shell polymer in the continuous phase of the essentially non-aqueous solvent. The rheology adjusting component, which included water, KOH, isopropyl alcohol and diethyl amine (Components K through N), was added to modify the rheology of the dispersion, e.g., to increase the apparent viscosity. The final NAD contained the dispersion of the acrylic core/shell polymer particles in the continuous phase of the essentially non-aqueous solvent as well as residual rheology adjusting component.

The formation of the acrylic core polymer and NAD was carried out using the following protocol. Ingredients A and B were added to a reactor and heated to 120° C. under nitrogen gas. Ingredients C, D and E were pre-mixed to form a monomer pre-mixture (MP). Ingredients F, G and H were pre-mixed to form a catalyst pre-mixture 1 (CP1). Ingredients I and J were pre-mixed to form a catalyst pre-mixture 2 (CP2). Pre-mixtures MP and CP1 were concurrently added from separate feeds to the reactor over the course of 3 hours and then held at 120° C. for 3 hours. The nitrogen gas was then changed to air and the reaction was held for an additional hour at 120° C. Pre-mixture CP2 was added drop-wise and the mixture was held for 3 hours. Finally, ingredients K, L, M and N were pre-mixed and added slowly to the reaction vessel under reflux conditions. The foaming that occurred was controlled by adjusting the addition rate. Approximately 1% of acrylic acid, based on the weight of the reaction mixture, was added to aid in efficient polymer formation, along with a small amount of glycidylmethacrylate to increase the attraction between the core and shell polymers. The reaction vessel was held for an hour at 120° C. and then cooled down to 90° C. to allow discharge of the resulting product (NAD). The resulting NAD had a shell polymer made up of a copolymer of isobutyl methacrylate and dodecyl methacrylate in a ratio of approximately 3:1 and a core polymer primarily composed of methylmethacrylate and 10% n-butylmethacrylate.

Example 2

Lab trials were performed using the NAD prepared according to Example 1. The NAD was incorporated into an overprint varnish (OPV), Topfinish™ TPF90 (Sun Chemical Corporation, Parsippany, N.J.) in various amounts from 10% to 100%. Rub resistance ratings and yellowing measurements were obtained and compared to a comparative overprint varnish, the same overprint varnish not containing any NAD (i.e., 0% NAD).

To prepare the overprint varnish with NAD, 10%, 20%, 30%, 40%, 60% or 80% NAD (based on the weight of the OPV composition) was mixed directly into the OVP under high shear and mixed until homogeneous using a Speedmixer™ DAC 150FVZ from Hauschild. Each of the OPV compositions were homogenized by mixing at 3000 rpm for 2 minutes. A composition of 100% NAD was also prepared (i.e., no OPV was added).

For the OPV compositions used for rub resistance tests (10%, 20% and 30% NAD), 1% cyan 15:3 flush pigment (Sun Chemical Corporation) was added to tint the compositions in order to make the potential rub-off visible. The pigment paste was introduced into the OPV mixture using the process described above for introduction of the NAD.

The resulting OPV compositions were printed at 2 g/m² on Maxigloss 200 g/m² printing stock (Igepa Group, Hamburg, Germany) using a Prüfbau printing machine. The prints were allowed to air dry for 15 minutes, until tack-free.

Rub resistance of the prints coated with OPV containing 10%, 20% or 30% NAD was assessed with a Sutherland® ink rub tester using a 910 g weight (100 strikes). The printed sheet was fixed to the moving device, whereas the plain paper was adhered to the still surface. Rub test results were assessed visually and assigned a number from 0 to 10 based on the amount of ink that rubbed off during the test. A rating of 0 indicated no visual rub-off detected, a rating of 5 indicated moderate rub-off, and a rating of 10 indicated severe rub off. The results are provided in Table 3.

The results from the rub resistance tests illustrated below in Table 3 show that addition of 10%, 20% or 30% of NAD into an overprint varnish improved rub resistance when tested 15 minutes after printing.

TABLE 3

Rub resistance ratings for OPV containing various amounts of NAD

| | NAD | | | |
|---|---|---|---|---|
| | 0%* | 10% | 20% | 30% |
| Rub resistance | 10 | 3 | 5 | 7 |

*= comparative overprint varnish not containing any NAD

Yellowing tests, based on accelerated heat aging, were also performed using the proof prints prepared and described above using the OPV compositions not containing pigment.

After coating the Maxigloss 200 g/m² paper stock with the OPV compositions containing 0%, 20%, 40%, 60% or 80% NAD using the Prüfbau device at 2 g/m², the prints were allowed to air dry for 15 minutes, until tack-free. Also prepared was paper stock coated with a comparative OPV containing no NAD (i.e., 0% NAD). The B value was measured for each of the prints, as well as for comparative paper stock not printed with either OPV or NAD (i.e., 0% OVP and 0% NAD). The B value represents yellow in color space. All LAB values were measured using a SpectroEye™ device from GretagMacBeth (D50/2°; absolute white; white backing; no polarization). After the initial set of LAB readings were taken, the prints (and comparative uncoated paper stock) were placed in a 60° C. oven for 3 days to accelerate aging. LAB readings of the prints were taken again after they were removed from the oven. The B value of each fresh print was compared to the B value of the same print after heat-aging and a delta B value was obtained by calculating the difference between the two B values. A delta B value was also calculated for the comparative unprinted paper stock. All LAB values obtained in the yellowing tests were based on an average of three readings. The results are indicated below in Table 4.

The delta B value indicates the degree of yellowing after heat-aging, with a lower delta B value corresponding to lower yellowing. Table 4 shows that as more NAD is incorporated into the OPV, the yellowing is lowered. OPV yellowing values were also calculated, which take into account the degree of yellowing due to the uncoated paper itself, which had a delta B value of 1.01 under the same conditions. The OPV yellowing values shown below in Table 4 were calculated by subtracting the delta B of the comparative uncoated paper stock from the delta B for each print.

TABLE 4

Yellowing properties of substrate coated with OPV compositions containing various amounts of NAD

| % NAD:% OPV | 0:0‡ | 0:100* | 20:80 | 40:60 | 60:40 | 80:20 | 100:0 |
|---|---|---|---|---|---|---|---|
| Delta B | 1.01 | 4.29 | 3.88 | 3.50 | 2.89 | 2.28 | 0.97 |
| OPV yellowing | — | 3.28 | 2.87 | 2.49 | 1.88 | 1.27 | −0.04 |

‡= bare paper stock not coated with OFV
*= comparative overprint varnish not containing any NAD The gloss levels of the OPV compositions containing 20%, 40%, 60% or 80% NAD were also tested and compared to the comparative OPV not containing any NAD as well as a coating of 100% NAD on a bare stock opacity chart. The opacity chart was created by printing a thick black stripe consisting of two layers of black, sheetfed lithographic ink across the width of APCO II gloss paper stock and subsequently dried. The black printed area is referred to as the "printed area." The printed area was positioned in the middle of the paper sheet and encompassed approximately one-third of the total area of the sheet. On either side of the printed area were the "unprinted areas" (i.e., bare stock), each encompassing one-third of the area of the sheet. The opacity chart was used to compare the gloss of the OPVs containing various amounts of NAD printed over the top of sheetfed ink-printed areas vs. unprinted areas. The gloss measurements were obtained using a Micro-TRI-gloss device from BYK Gardner with the measurement angle set at 60°. The gloss readings were taken 24 hours after printing and were the average of 5 measurements. Table 5 shows the gloss levels as well as the delta gloss values (the difference between the gloss level of the printed area or unprinted area and the gloss level of the printed area or unprinted area coated with an OPV, respectively). Also indicated in Table 5 are gloss contrast values, which are the difference in gloss between the printed area overprinted with OPV compared to the unprinted area overprinted with OPV.

The results indicate that while introduction of NAD into OPV tends to decrease gloss in the unprinted areas, the introduction of NAD into OPV tends to increase gloss in printed area, making the printed areas stand out more because of the gloss differential.

TABLE 5

Gloss levels of printed and imprinted areas of paper stock coated with OPV compositions

| % NAD:% OPV | 0:0‡ | 0:100* | 20:80 | 40:60 | 60:40 | 80:20 | 100:0 |
|---|---|---|---|---|---|---|---|
| Unprinted area w/o OPV | 37.3 | — | — | — | — | — | — |
| Unprinted area + OPV | — | 39.1 | 34.1 | 29.1 | 24.2 | 26.5 | 22.1 |
| Delta gloss | — | 1.8 | −3.2 | −8.2 | −13.1 | −10.8 | −15.2 |
| Printed area w/o OPV | 68.0 | — | — | — | — | — | — |
| Printed area + OPV | — | 40.8 | 42.9 | 45.6 | 47.7 | 40.5 | 45.4 |
| Delta gloss | — | −27.2 | −25.1 | −22.4 | −20.3 | −27.5 | −22.6 |
| Gloss contrast | — | 1.7 | 8.8 | 16.5 | 23.5 | 14 | 23.3 |

‡= bare paper stock not coated with OPV
*= comparative overprint varnish not containing any NAD Example 3

Print trials were performed using the NAD prepared according to Example 1 incorporated into an overprint varnish (OPV), Topfinish™ TPF90 (Sun Chemical Corporation, Parsippany, N.J.). Rub resistance ratings and gloss readings were obtained and compared to a comparative overprint varnish, the same overprint varnish not containing any NAD (i.e., 0% NAD).

To prepare the overprint varnish with NAD, 25% NAD (based on the weight of the OPV composition) was mixed directly into the OVP under high shear and mixed until homogeneous using a Speedmixer™ DAC 150FVZ from Hauschild. The OPV composition was homogenized by mixing at 3000 rpm for 2 minutes. The resulting OPV and the OPV containing 0% NAD were tinted with 1% of cyan 15:3 flush pigment (Sun Chemical Corporation) for control purposes in order to visualize the OPV in order to control the amount transferred onto the paper, which has an influence on gloss and rub resistance. The printer was then able to control the amount of OPV transferred onto the paper by measuring the optical density of the OPVs. The optical density measured with the cyan filter was 0.45-0.5. The pigment paste was introduced into the OPV mixture using the process described above for introduction of the NAD.

The resulting OPV compositions were printed using a 4 color Heidelberg MO press that printed with a black ink (Sunlit® Diamond DIA46; Sun Chemical Corporation), a cyan ink (Sunlit® Diamond DIA25; Sun Chemical Corporation), a magenta ink (Sunlit® Diamond DIA27; Sun Chemical Corporation), and the overprint varnish compositions, which were run without a bridging roller. Prints were prepared on either gloss coated Magnostar® 115 g/m$^2$ paper (Sappi, Boston, Mass.) or gloss coated Maxigloss 200 g/m$^2$ paper (Igepa Group). Approximately 3000 sheets of the Magnostar® paper were run, followed by 100 sheets of the Maxigloss paper, at a print speed of 9000 sheets per hour. Neither an infrared dryer, which could improve drying, nor powder (e.g., starch powder), which could protect the printed sheet against set-off, were used for purposes of the printing trial. The OPV composition containing 25% NAD and 1% cyan pigment for visualization was printed directly onto the Magnostar® paper and the Maxigloss paper. The OPV composition was also printed onto the Maxigloss and Magnostar® paper after it had been printed with one layer of each of the inks (black, cyan and magenta) and Magnostar® paper that had been coated with either black, cyan or magenta ink. Comparative prints were also prepared using the OPV composition containing no NAD (i.e., 0% NAD) and 1% cyan pigment, added for analytical purposes to visualize any rub-off.

The prints were allowed to air dry for 15 minutes, until tack-free. Rub resistance of the prints was assessed with a Sutherland® ink rub tester using a 910 g weight (100 strikes). The printed sheet was fixed to the moving device, whereas the plain paper was adhered to the still surface. Rub test results were assessed visually and assigned a number from 0 to 10 based on the amount of ink that rubbed off during the test. A rating of 0 indicated no visual rub-off detected, a rating of 5 indicated moderate rub-off, and a rating of 10 indicated severe rub off. The results are provided in Table 6.

The prints coated with the OPV containing 25% NAD exhibited improved rub resistance when tested 15 minutes after printing as compared to the prints coated with an OPV not containing any NAD.

TABLE 6

Rub resistance ratings from print trials on gloss paper

| Print sample | Rub resistance rating |
|---|---|
| OPV + 1% cyan pigment + 0% NAD printed on Magnostar®* | 6 |
| OPV + 1% cyan pigment + 25% NAD printed on Magnostar® | 4 |
| OPV + 1% cyan pigment + 0% NAD printed on Maxigloss* | 5 |
| OPV + 1% cyan pigment + 25% NAD printed on Maxigloss | 4 |
| OPV + 1% cyan pigment + 0% NAD printed on Maxigloss over 1 layer each of black, cyan and magenta inks* | 6 |
| OPV + 1% cyan pigment + 25% NAD printed on Maxigloss over 1 layer each of black, cyan and magenta inks | 4.5 |

*= comparative overprint varnish not containing any NAD

Gloss readings were also obtained for these prints. Gloss measurements were obtained using a Micro-TRI-gloss device from BYK Gardner with the measurement angle set at 60°. The gloss readings were taken 24 hours after printing and were the average of 5 measurements. The results, shown in Table 7 below, show that the gloss values of the OPV are similar when printed directly onto paper substrates, whether or not the OPV contains NAD, but the OPV containing 25% NAD shows significant gloss increase when printed over the top of other inks as compared to the OPV not containing any NAD.

TABLE 7

Gloss readings of OPV compositions printed on gloss paper

| Print sample | Gloss |
|---|---|
| Unprinted Magnostar®‡ | 41 |
| OPV + 1% cyan pigment + 0% NAD printed on Magnostar®* | 37 |
| OPV + 1% cyan pigment + 25% NAD printed on Magnostar® | 36 |
| OPV + 1% cyan pigment + 0% NAD printed on Magnostar® over 1 layer of magenta ink* | 35 |
| OPV + 1% cyan pigment + 25% NAD printed on Magnostar® over 1 layer of magenta ink | 43 |
| OPV + 1% cyan pigment + 0% NAD printed on Magnostar® over 1 layer of cyan ink* | 46 |
| OPV + 1% cyan pigment + 25% NAD printed on Magnostar® over 1 layer of cyan ink | 54 |
| OPV + 1% cyan pigment + 0% NAD printed on Magnostar® over 1 layer of black ink* | 39 |
| OPV + 1% cyan pigment + 25% NAD printed on Magnostar® over 1 layer of black ink | 46 |
| OPV + 1% cyan pigment + 0% NAD printed on Magnostar® over 1 layer each of black, cyan and magenta inks* | 41 |
| OPV + 1% cyan pigment + 25% NAD printed on Magnostar® over 1 layer each of black, cyan and magenta inks | 52 |

‡= bare paper stock not coated with OPV
*= comparative overprint varnish not containing any NAD The present invention has been described in detail, including the preferred embodiments thereof, but is more broadly applicable as will be understood by those skilled in the art. It will be appreciated that those skilled in the art, upon consideration of the present disclosure, may make modifications and/or improvements on this invention that fall within the scope and spirit of the invention. Since modifications will be apparent to those of skill in this art, it is intended that this invention be limited only by the scope of the following claims.

What is claimed is:

1. An overprint varnish, comprising:
   (a) a resin;
   (b) a solvent; and
   (c) a non-aqueous dispersion of an acrylic core/shell polymer, comprising:
      (i) an acrylic shell polymer;
      (ii) an acrylic core polymer;
      (iii) a continuous phase of an essentially non-aqueous solvent; and
      (iv) a rheology adjusting component.

2. The overprint varnish of claim 1, wherein the acrylic shell polymer envelops the acrylic core polymer to form an acrylic core/shell polymer particle and the core/shell polymer particle is dispersed in the continuous phase essentially non-aqueous solvent.

3. The overprint varnish of claim 1, wherein the acrylic shell polymer is soluble in the continuous phase of the essentially non-aqueous solvent; and
   the acrylic core polymer is insoluble in the continuous phase of the essentially non-aqueous solvent but is soluble in the acrylic shell polymer.

4. The overprint varnish of claim 1, wherein the continuous phase of essentially non-aqueous solvent contains 0.001 wt % to 1.0 wt % water based on the weight of the non-aqueous dispersion; and/or the continuous phase essentially non-aqueous solvent has a sulfur content at or below 1000 ppm; and/or the continuous phase essentially non-aqueous solvent has an aniline point between 45° C. and 90° C.

5. The overprint varnish of claim 1, wherein the rheology adjusting component contains water, an alcohol, an alkali compound and an amine.

6. The overprint varnish of claim 1, wherein the rheology adjusting component is present in an amount from 0.01 wt % to 2.0 wt % based on the weight of the non-aqueous dispersion.

7. The overprint varnish of claim 1, wherein the acrylic shell polymer contains isobutyl methacrylate and dodecyl methacrylate; and/or the acrylic core polymer contains methylmethacrylate and N-butyl methacrylate.

8. The overprint varnish of claim 1, wherein 90% of the acrylic core/shell polymer particles have a particle size of less than 3 microns.

9. The overprint varnish of claim 1, wherein the acrylic core/shell polymer particles contain from 15 wt % to 75 wt % acrylic core polymer based on the weight of the acrylic core/shell polymer particle; and/or wherein the acrylic core/shell polymer particles contain from 15 wt % to 75 wt % acrylic shell polymer based on the weight of the acrylic core/shell polymer particle; and/or the acrylic core/shell polymer particles have an average core-to-shell ratio of from 0.60 to 2.0.

10. The overprint varnish of claim 1, wherein the amount of acrylic core polymer in the non-aqueous dispersion is from 15 wt % to 35 wt % based on the weight of the non-aqueous dispersion; and/or wherein the amount of acrylic shell polymer in the non-aqueous dispersion is from 15 wt % to 35 wt % based on the weight of the non-aqueous dispersion.

11. The overprint varnish of claim 1, wherein the amount of acrylic core/shell polymer particles in the non-aqueous dispersion is from 30 wt % to 70 wt % based on the weight of the non-aqueous dispersion; and/or wherein the amount of essentially non-aqueous solvent in the non-aqueous dispersion is from 30 wt % to 70 wt % based on the weight of the non-aqueous dispersion.

12. The overprint varnish of claim 1, wherein the non-aqueous dispersion has a viscosity of 10 Pas to 150 Pas at a shear rate of 50 s$^{-1}$.

13. The overprint varnish of claim 1, wherein the continuous phase essentially non-aqueous solvent is a hydrocarbon solvent.

14. The overprint varnish of claim 1, wherein the acrylic shell polymer and/or acrylic core polymer contain a copolymer of monomers that contain a functional group selected from among a carboxyl group, a hydroxyl group and a vinyl group.

15. The overprint varnish of claim 14, wherein the monomers containing a carboxyl group are selected from among acrylic acid, methacrylic acid, itaconic acid and maleic acid; and/or wherein the monomers containing a hydroxyl group are selected from among 2-hydroxy ethyl acrylate, 2-hydroxy ethyl methacrylate, 2-hydroxy propyl acrylate and 2-hydroxy propyl methacrylate.

16. The overprint varnish of claim 1, wherein the non-aqueous dispersion is present in an amount that is between 10 wt % and 99 wt % based on the weight of the overprint varnish or wherein the non-aqueous dispersion is in an amount that is 100 wt %, based on the weight of the overprint varnish.

17. A coated substrate, comprising an overprint varnish of claim 1.

18. The coated substrate of claim 17, wherein the substrate comprises at least one area printed with ink.

19. A method of preparing a coated substrate, comprising:
   preparing the overprint varnish of claim 1, wherein the overprint varnish contains the non-aqueous dispersion in an amount that is 10 wt % to 100 wt % based on the weight of the overprint varnish; and
   coating the overprint varnish on a substrate.

20. A method for improving the rub resistance, and/or for increasing the gloss values, and/or for increasing resistance to yellowing of an overprint varnish on a coated substrate, comprising:
   preparing the overprint varnish of claim 1, wherein the overprint varnish non-aqueous dispersion is in an amount that is 10 wt % to 100 wt % based on the weight of the overprint varnish; and
   coating the overprint varnish on a substrate to produce a coated substrate.

21. The method of claim 19, further comprising applying ink to the substrate before coating with the overprint varnish; and/or wherein the substrate is gloss coated paper.

22. A coated substrate made by the method of claim 19.

23. The overprint varnish of claim 1, wherein the rheology adjusting component contains a $C_1$-$C_6$ alcohol.

24. The overprint varnish of claim 1, wherein the rheology adjusting component a metal hydroxide.

25. The overprint varnish of claim 1, wherein the rheology adjusting component contains an alkyl amine.

26. The overprint varnish of claim 1, wherein the rheology adjusting component contains a primary amine, secondary amine, tertiary amine, or a combination thereof.

27. The overprint varnish of claim 1, wherein the rheology adjusting component contains a mixture of water, potassium hydroxide, isopropanol and diethylamine.

28. The overprint varnish of claim 1, wherein at least 50% of the acrylic core/shell polymer particles have a particle size of less than 1.5 microns.

29. The overprint varnish of claim 1, wherein the average particle size of the acrylic core/shell polymer particles is in the range of 300 nm to 1300 nm.

30. The overprint varnish of claim 1, wherein the non-aqueous dispersion has a viscosity of 40 Pa·s to 100 Pa·s at a shear rate of 50 s$^{-1}$.

31. The overprint varnish of claim 1, wherein the continuous phase of an essentially non-aqueous solvent is a hydrotreated light naphthenic distillate.

* * * * *